United States Patent
Shoji et al.

(10) Patent No.: US 8,554,071 B2
(45) Date of Patent: Oct. 8, 2013

(54) OPTICAL TRANSMISSION APPARATUS AND CONTINUITY TESTING METHOD

(75) Inventors: Takuma Shoji, Kawasaki (JP); Ichiro Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 13/011,385

(22) Filed: Jan. 21, 2011

(65) Prior Publication Data
US 2011/0182585 A1      Jul. 28, 2011

(30) Foreign Application Priority Data
Jan. 28, 2010   (JP) .................................. 2010-17286

(51) Int. Cl.
*H04B 10/08* (2011.01)
(52) U.S. Cl.
USPC ........ 398/9; 398/10; 398/11; 398/12; 398/14; 398/16; 398/17; 398/18; 398/19; 398/25; 398/34; 398/37; 398/38; 398/79; 398/83
(58) Field of Classification Search
USPC ..................... 398/9–19, 25, 34, 37, 38, 79, 83
See application file for complete search history.

(56) References Cited

U.S. PATENT DOCUMENTS

| | | | | |
|---|---|---|---|---|
| 7,286,755 | B1 * | 10/2007 | Goodwill et al. | 398/26 |
| 7,627,244 | B2 * | 12/2009 | Fujita | 398/19 |
| 2003/0174392 | A1 * | 9/2003 | Rapp | 359/341.43 |
| 2006/0269284 | A1 * | 11/2006 | Fujita | 398/38 |
| 2009/0226167 | A1 * | 9/2009 | Onaka et al. | 398/45 |
| 2010/0129079 | A1 * | 5/2010 | Bato et al. | 398/79 |

FOREIGN PATENT DOCUMENTS

JP      2006-333136      12/2006

* cited by examiner

*Primary Examiner* — Li Liu
(74) *Attorney, Agent, or Firm* — Fujitsu Patent Center

(57) ABSTRACT

An optical transmission apparatus includes an amplifier, a first output port to select a wavelength from the wavelength-division-multiplexed signal light amplified and output signal light with the selected wavelength to an operation line, a second output port to output multiplexed light obtained by multiplexing any one of first spontaneous emission light and second spontaneous emission light to a preliminary line, the first and the second spontaneous emission light being parts of spontaneous emission light generated by the amplifier, the first spontaneous emission light being in a wavelength range that is not selected, and the second spontaneous emission light being in a wavelength range other than a range of the wavelength-division-multiplexed signal light, and a judger to judge a continuity state of the operation line by using the signal light output to the operation line and a continuity state of the preliminary line.

8 Claims, 17 Drawing Sheets

FIG. 4

THRESHOLD DB

| OPTICAL-TRANSMISSION-LINE ID | NUMBER OF WAVELENGTHS | NUMBER OF UPSTREAM AMPLIFIERS | PD THRESHOLD ||
|---|---|---|---|---|
| | | | UPPER LIMIT | LOWER LIMIT |
| A | 1 | 1 | X1 | Y1 |
| | | 2 | X2 | Y2 |
| | | 3 | X3 | Y3 |
| | | ... | ... | ... |
| | 2 | 1 | X4 | Y4 |
| | | 2 | X5 | Y5 |
| | | 3 | X6 | Y6 |
| | | ... | ... | ... |
| | ... | ... | ... | ... |
| B | 1 | 1 | ... | ... |
| | | 2 | ... | ... |
| | | 3 | ... | ... |
| | | ... | ... | ... |
| | 2 | 1 | ... | ... |
| | | 2 | ... | ... |
| | | 3 | ... | ... |
| | | ... | ... | ... |
| | ... | ... | ... | ... |
| ... | ... | ... | ... | ... |

FIG. 17

THRESHOLD DB

| OPTICAL-TRANSMISSION-LINE ID | PD THRESHOLD | |
|---|---|---|
| | UPPER LIMIT | LOWER LIMIT |
| A | X1 | Y1 |
| B | X2 | Y2 |
| ... | ... | ... |

OPTICAL TRANSMISSION APPARATUS AND CONTINUITY TESTING METHOD

CROSS-REFERENCE TO RELATED APPLICATIONS

This application is based upon and claims the benefit of priority of the prior Japanese Patent Application No. 2010-17286, filed on Jan. 28, 2010, the entire contents of which are incorporated herein by reference.

FIELD

The present embodiments relate to an optical transmission apparatus and a continuity testing method.

BACKGROUND

In recent years, wavelength division multiplexing (WDM) networks using a WDM method have been established as optical communication networks. The WDM networks include optical transmission apparatuses as nodes for adding or dropping channels to/from the wavelength-multiplexed channels.

In particular, many WDM networks that serve as local (metro) networks often have a network structure including many optical transmission apparatuses arranged in a ring networks or a mesh networks. The number of optical transmission apparatuses included in a WDM network is predicted to increase with the expansion of the WDM network.

Each optical transmission apparatus includes various types of optical components, which are connected to each other via optical transmission lines, such as optical fibers. Therefore, as the number of optical transmission apparatuses in the WDM network increases, the number of optical transmission lines via which the optical components in the optical transmission apparatuses are connected to each other greatly increases. The increase in the number of optical transmission lines makes the continuity test of the optical transmission lines for the maintenance and operation of the apparatuses complex.

Accordingly, various techniques for increasing the efficiency of the continuity test of the optical transmission lines in the apparatuses have been considered. For example, a technique is known in which amplified spontaneous emission (ASE) light emitted from an amplifier is used. According to this technique, an optical transmission apparatus outputs the ASE light from the amplifier to all of the optical transmission lines included in the apparatus, and detects optical power of the ASE light at each optical transmission line by a photodiode (PD) provided at the optical transmission line. Thus, the optical continuity is checked for all of the optical transmission lines in the apparatus.

According to the above-described technique, in the optical continuity test of the optical transmission lines, excitation light is supplied to the amplifier and the ASE light emitted from the amplifier is amplified to a level such that the ASE light may be detected by the PDs. Therefore, if WDM signal light is directly input to the amplifier, the WDM signal light is amplified in addition to the ASE light by the excitation light supplied to the amplifier, which reduces the communication reliability. This may be avoided by temporarily stopping the input of the WDM signal light. However, if the input of the WDM signal light is temporarily stopped, the communication stability is reduced.

SUMMARY

According to an aspect of the disclosed embodiments, an optical transmission apparatus includes an amplifier to receive and amplify wavelength-division-multiplexed signal light, a first output port to select a wavelength from the wavelength-division-multiplexed signal light amplified by the amplifier and output signal light with the selected wavelength to an operation line, which is one of a plurality of optical transmission lines, a second output port that outputs multiplexed light obtained by multiplexing any one of first spontaneous emission light and/or second spontaneous emission light to a preliminary line, which is another one of the plurality of optical transmission lines, the first spontaneous emission light and the second spontaneous emission light being parts of spontaneous emission light generated by the amplifier, the first spontaneous emission light being in a wavelength range that is not selected by the first output port, and the second spontaneous emission light being in a wavelength range other than a wavelength range of the wavelength-division-multiplexed signal light, and a judger to judge a continuity state of the operation line by using the signal light output to the operation line by the first output port and a continuity state of the preliminary line by using the multiplexed light output to the preliminary line by the second output port.

The object and advantages of the disclosed embodiments will be realized and attained at least by the elements, features, and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 4 is a table illustrating an example of a threshold DB.

FIG. 10 is a flowchart illustrating an operation illustrated in FIG. 9 in which the continuity test is performed for optical transmission lines that connect optical dropping sections to optical adding sections in optical add-drop multiplexers.

FIG. 11 is a flowchart illustrating an operation illustrated in FIG. 9 in which the continuity test is performed for optical transmission lines that connect the optical adding sections in the optical add-drop multiplexers to downstream amplifiers.

FIG. 14 is a flowchart illustrating an operation illustrated in FIG. 13 in which the continuity test is performed for optical transmission lines that connect optical dropping sections to optical adding sections in optical add-drop multiplexers.

FIG. 15 is a flowchart illustrating an operation illustrated in FIG. 13 in which the continuity test is performed for optical transmission lines that connect the optical adding sections in the optical add-drop multiplexers to downstream amplifiers.

FIG. 17 is a table illustrating an example of a threshold DB according to the fourth embodiment.

DESCRIPTION OF EMBODIMENTS

Optical transmission apparatuses and continuity testing methods according to embodiments disclosed in the present application will be described in detail with reference to the drawings.

The structure of an optical transmission apparatus according to a first embodiment will now be described. The optical transmission apparatus according to the present embodiment is used, for example, as an intermediate device (node) of a wavelength division multiplexing (WDM) network, and functions as an optical add-drop multiplexer (OADM) for adding or dropping channels to/from the wavelength-multiplexed channels.

In the following description, a continuity test of optical transmission lines in the optical transmission apparatus that functions as an OADM will be described as an example. However, the optical transmission apparatus is not limited to this. The present invention may be applied to any suitable optical transmission apparatus.

Figure 1:
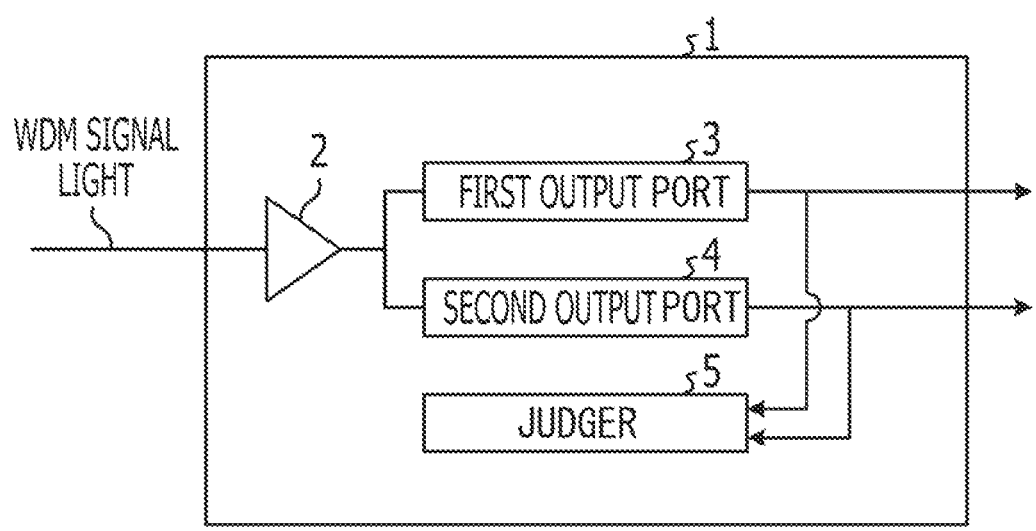
FIG. 1 is a block diagram illustrating the structure of an optical transmission apparatus according to a first embodiment.

FIG. 1 is a block diagram illustrating the structure of an optical transmission apparatus 1 according to the first embodiment. As illustrated in FIG. 1, the optical transmission apparatus 1 according to the present embodiment includes an amplifier 2, a first output port 3, a second output port 4, and a judger 5.

The amplifier 2 receives and amplifies wavelength-division-multiplexed signal light (WDM signal light). The first output port 3 selects a specific wavelength from the WDM signal light amplified by the amplifier 2, and outputs signal light with the selected wavelength to an output port connected to a preset operation line, which is one of a plurality of optical transmission lines.

The second output port 4 outputs ASE multiplexed light obtained by multiplexing first ASE light and/or second ASE light to an output port connected to a preset preliminary line.

The first ASE light and the second ASE light are parts of ASE light that is generated by the amplifier 2, the first ASE light being in a wavelength range that is not selected by the first output port 3, and the second ASE light being in a wavelength range other than the wavelength range of the WDM signal light.

Figure 2:
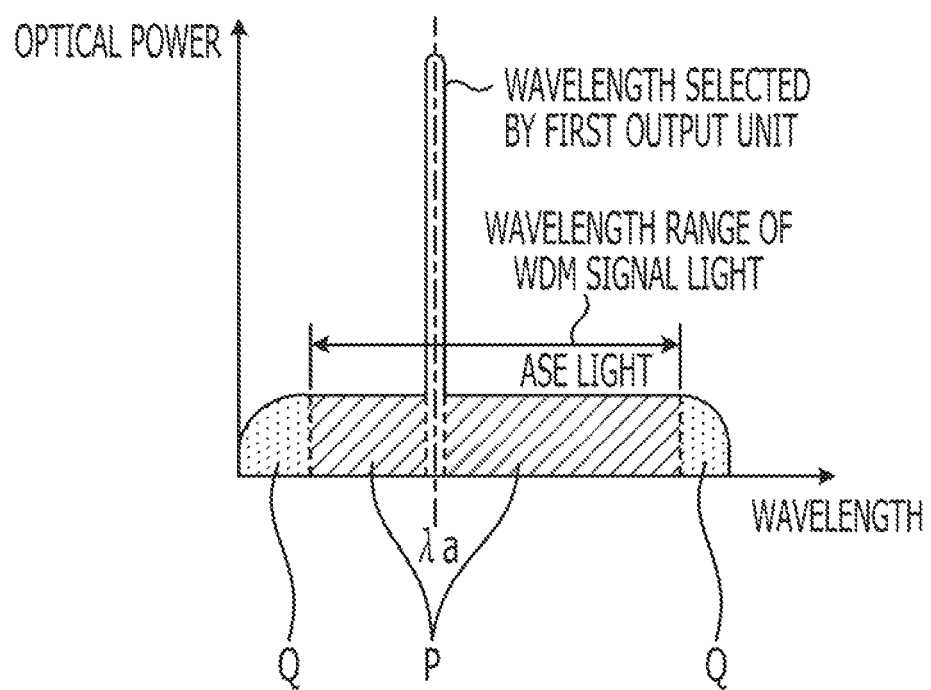
FIG. 2 is a graph illustrating an example of a process performed by a second output port.

FIG. 2 is a graph illustrating an example of a process performed by the second output port 4. In the graph of FIG. 2, the vertical axis indicates the optical power and the horizontal axis indicates the wavelength. It is assumed that the wavelength λa is selected by the first output port 3 and signal light with the wavelength λa is output to the operation line. The second output port 4 outputs ASE multiplexed light obtained by multiplexing first ASE light P and/or second ASE light Q to the preset preliminary line. The first ASE light P and the second ASE light Q are parts of the ASE light that is generated by the amplifier 2, the first ASE light P being in a wavelength range that is not selected by the first output port 3, and the second ASE light Q being in a wavelength range other than the wavelength range of the WDM signal light.

Referring to FIG. 1 again, the judger 5 judges the continuity state of the operation line using the signal light output to the operation line by the first output port 3, and judges the continuity state of the preliminary line using the ASE multiplexed light output to the preliminary line by the second output port 4.

Thus, the optical transmission apparatus 1 judges the continuity state of the preliminary line by outputting the ASE multiplexed light obtained by multiplexing the first ASE light and/or the second ASE light to the preliminary line, the first ASE light being the part of the ASE light from the amplifier 2 that is in the wavelength range that is not output to the operation line, and the second ASE light being the part of the ASE light from the amplifier 2 that is in the wavelength range other than the wavelength range of the WDM signal light. According to the optical transmission apparatus 1, it is unnecessary to amplify the ASE light from the amplifier 2 to a level such that the ASE light may be detected by a detector, such as a PD. Therefore, the continuity of the preliminary line may be checked without stopping the WDM signal light that is being output to the operation line. As a result, according to the optical transmission apparatus 1, the continuity test of the optical transmission lines in the apparatus may be performed while maintaining the communication stability.

An optical transmission apparatus according to a second embodiment will now be described. The optical transmission apparatus according to the second embodiment includes a plurality of optical transmission lines with which optical components in the apparatus are connected to each other. The WDM signal light is output to some of the optical transmission lines that are preset as operation lines. The optical transmission apparatus according to the second embodiment judges the continuity states of preliminary lines by outputting ASE multiplexed light obtained by multiplexing first ASE light and second ASE light to the preliminary lines. The first ASE light and the second ASE light are parts of the ASE light from an amplifier, the first ASE light being in a wavelength range that is not output to the operation lines, and the second ASE light being in a wavelength range other than the wavelength range of the WDM signal light.

According to the optical transmission apparatus of the second embodiment, the continuity states of the preliminary lines are judged by using the ASE multiplexed light obtained by multiplexing the ASE light. Therefore, the continuity of the preliminary lines may be checked without stopping the WDM signal light that is being output to the operation lines. As a result, according to the optical transmission apparatus of the second embodiment, the continuity test of the optical transmission lines in the apparatus may be easily performed while maintaining the communication stability.

Figure 3:
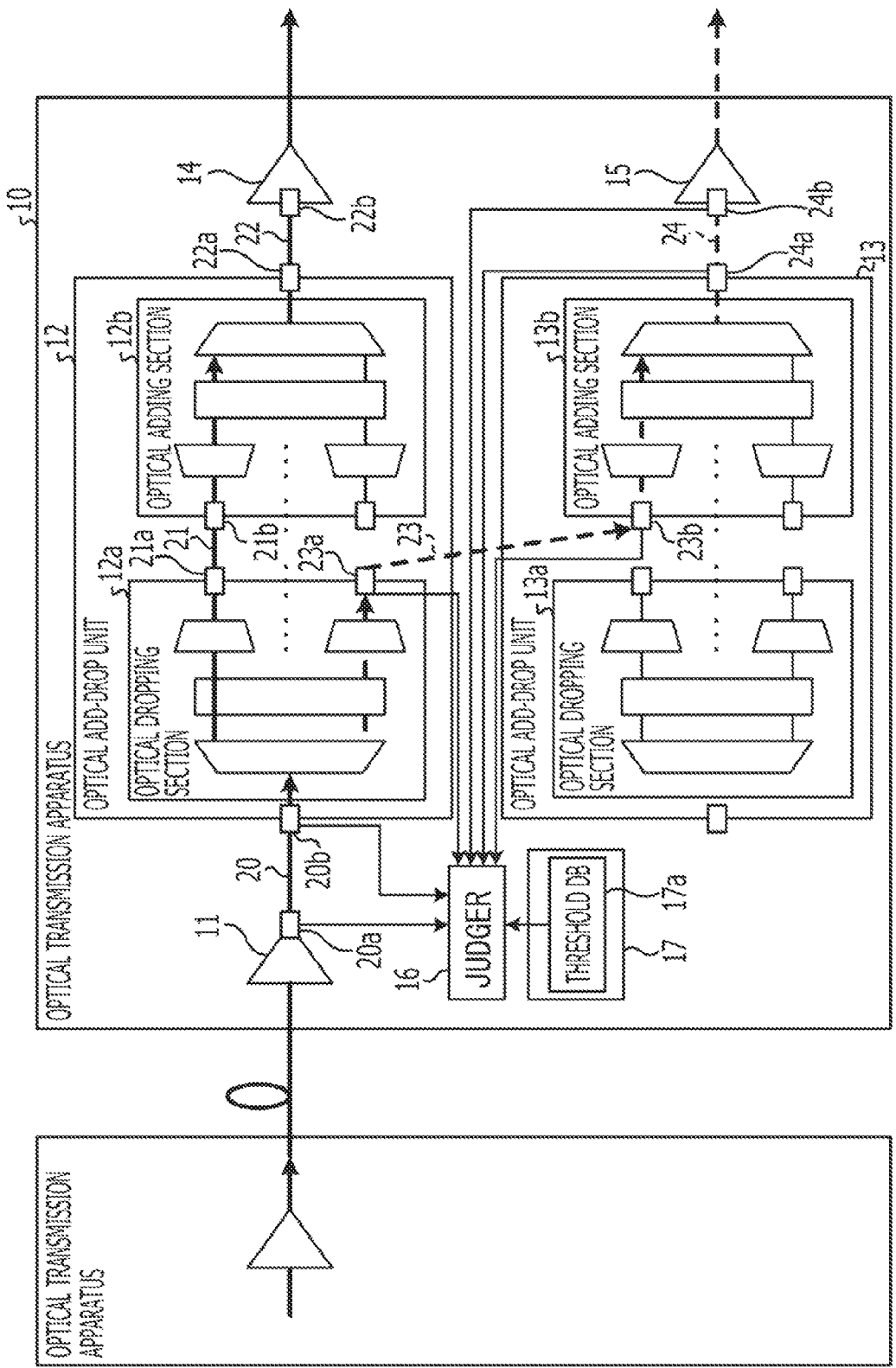
FIG. 3 is a block diagram illustrating the structure of an optical transmission apparatus according to a second embodiment.

FIG. 3 is a block diagram illustrating the structure of an optical transmission apparatus 10 according to the second embodiment. As illustrated in FIG. 3, the optical transmission apparatus 10 according to the second embodiment includes an upstream amplifier 11, optical add-drop multiplexers 12 and 13, downstream amplifiers 14 and 15, a judger 16, and a storage 17.

The upstream amplifier 11, the optical add-drop multiplexers 12 and 13, and the downstream amplifiers 14 and 15, which are optical components, are connected to each other by optical transmission lines, such as optical fibers. The upstream amplifier 11 is connected to an optical dropping section 12a, which will be described below, in the optical add-drop multiplexer 12 by an optical transmission line 20. The optical dropping section 12a is connected to an optical adding section 12b, which will be described below, in the optical add-drop multiplexer 12 by an optical transmission line 21. The optical adding section 12b is connected to the downstream amplifier 14 by an optical transmission line 22. The optical dropping section 12a is connected to an optical adding section 13b in the optical add-drop multiplexer 13 by an optical transmission line 23. The optical adding section 13b in the optical add-drop multiplexer 13 is connected to the downstream amplifier 15 by an optical transmission line 24.

Of the optical transmission lines 20 to 24, the optical transmission lines 20, 21, and 22 are preset as operation lines to which the WDM signal light is input, and the optical transmission lines 23 and 24 are preset as preliminary lines to which the WDM signal light is not input.

Photodiodes (PDs) 20a to 24a are provided at ends of the optical transmission lines 20 to 24, respectively, and PDs 20b to 24b are provided at the other ends of the optical transmission lines 20 to 24, respectively. The PDs 20a to 24a and the PDs 20b to 24b detect the optical power of light that passes through the optical transmission lines 20 to 24 at both ends of the optical transmission lines 20 to 24, and output the detected optical power to the judger 16.

The upstream amplifier 11 amplifies the WDM signal light that is input to the optical transmission apparatus 10 from an optical transmission apparatus disposed upstream thereof. The optical add-drop multiplexer 12 includes the optical dropping section 12a and the optical adding section 12b. The optical dropping section 12a drops signal light with a specific wavelength from the WDM signal light amplified by the upstream amplifier 11. The optical adding section 12b adds signal light with a specific wavelength to the WDM signal light dropped by the optical dropping section 12a.

In the example illustrated in FIG. 3, the WDM signal light is input to the optical dropping section 12a in the optical add-drop multiplexer 12 from the upstream amplifier 11 through the optical transmission line 20. The optical dropping section 12a selects a specific wavelength from the WDM signal light and outputs signal light with the selected wavelength to the optical transmission line 21, which is an operation line, without outputting the signal light to the optical transmission line 23, which is a preliminary line. The optical adding section 12b adds signal light with a specific wavelength to the WDM signal light dropped by the optical dropping section 12a and outputs the resulting signal light to the optical transmission line 22, which is an operation line.

The optical dropping section 12a also outputs ASE multiplexed light obtained by multiplexing first ASE light and/or second ASE light to the optical transmission line 23, which is a preliminary line. The first ASE light and the second ASE light are parts of ASE light that is generated by the upstream amplifier 11, the first ASE light being in a wavelength range that is not selected as that of the WDM signal light, and the second ASE light being in a wavelength range other than the wavelength range of the WDM signal light. The optical adding section 13b in the optical add-drop multiplexer 13 outputs the ASE multiplexed light obtained by multiplexing the first ASE light and/or the second ASE light to the optical transmission line 24, which is a preliminary line. The detailed structure of the optical add-drop multiplexers 12 and 13 will be described below. The downstream amplifier 14 receives the WDM signal light from the optical add-drop multiplexer 12 through the optical transmission line 22, amplifies the WDM signal light, and outputs the WDM signal light to an optical transmission apparatus (not illustrated) that functions as the next node that is disposed downstream of the optical transmission apparatus 11.

The judger 16 judges the continuity states of the optical transmission lines 20, 21, and 22, which are operation lines, by using the WDM signal light output to the optical transmission lines 20, 21, and 22 from the upstream amplifier 11, the optical dropping section 12a in the optical add-drop multiplexer 12, and the optical adding section 12b in the optical add-drop multiplexer 12, respectively. More specifically, the judger 16 receives the optical power of the WDM signal light output to the optical transmission line 20 from each of the PDs 20a and 20b provided at the ends of the optical transmission line 20, and judges the continuity state of the optical transmission line 20 by determining whether or not the two optical powers are within a specific threshold range. In addition, the judger 16 receives the optical power of the WDM signal light output to the optical transmission line 21 from each of the PDs 21a and 21b provided at the ends of the optical transmission line 21, and judges the continuity state of the optical transmission line 21 by determining whether or not the two optical powers are within a specific threshold range. The judger 16 receives the optical power of the WDM signal light output to the optical transmission line 22 from each of the PDs 22a and 22b provided at the ends of the optical transmission line 22, and judges the continuity state of the optical transmission line 22 by determining whether or not the two optical powers are within a specific threshold range.

The judger 16 also judges the continuity states of the optical transmission lines 23 and 24, which are preliminary lines, by using the ASE multiplexed light output to the optical transmission lines 23 and 24 from the optical dropping section 12a in the optical add-drop multiplexer 12 and the optical adding section 13b in the optical add-drop multiplexer 13, respectively. More specifically, the judger 16 receives the optical power of the ASE multiplexed light output to the optical transmission line 23 from each of the PDs 23a and 23b provided at the ends of the optical transmission line 23, and judges the continuity state of the optical transmission line 23 by determining whether or not the two optical powers are within a specific threshold range. The judger 16 receives the optical power of the ASE multiplexed light output to the optical transmission line 24 from each of the PDs 24a and 24b provided at the ends of the optical transmission line 24, and judges the continuity state of the optical transmission line 24 by determining whether or not the two optical powers are within a specific threshold range.

The storage 17 stores data used in the judging process performed by the judger 16. The storage 17 is, for example, a semiconductor memory element such as a random access memory (RAM), a read only memory (ROM), and a flash memory, or a storage device such as a hard disk drive (HDD) and an optical disc. The storage 17 includes, in particular, a threshold database (DB) 17a.

The threshold DB 17a stores PD thresholds referred to by the judger 16 when the judger 16 determines whether or not the optical powers of the WDM signal light or the ASE multiplexed light output to the optical transmission lines are within a specific threshold range. FIG. 4 illustrates an example of the threshold DB 17a.

Referring to FIG. 4, the threshold DB 17a stores optical-transmission-line identifications (IDs) in association with the number of wavelengths, the number of upstream amplifiers, and the PD thresholds. The optical-transmission-line IDs are the identification information for identifying the optical transmission lines. The number of wavelengths is the number of multiplexed wavelengths, and is preset for each optical transmission line. The number of upstream amplifiers is the number of amplifiers disposed upstream of each optical transmission line in the intermediate device. The PD thresholds define the threshold range (upper and lower limit values) for the PDs disposed at the ends of each optical transmission line.

Figure 5:
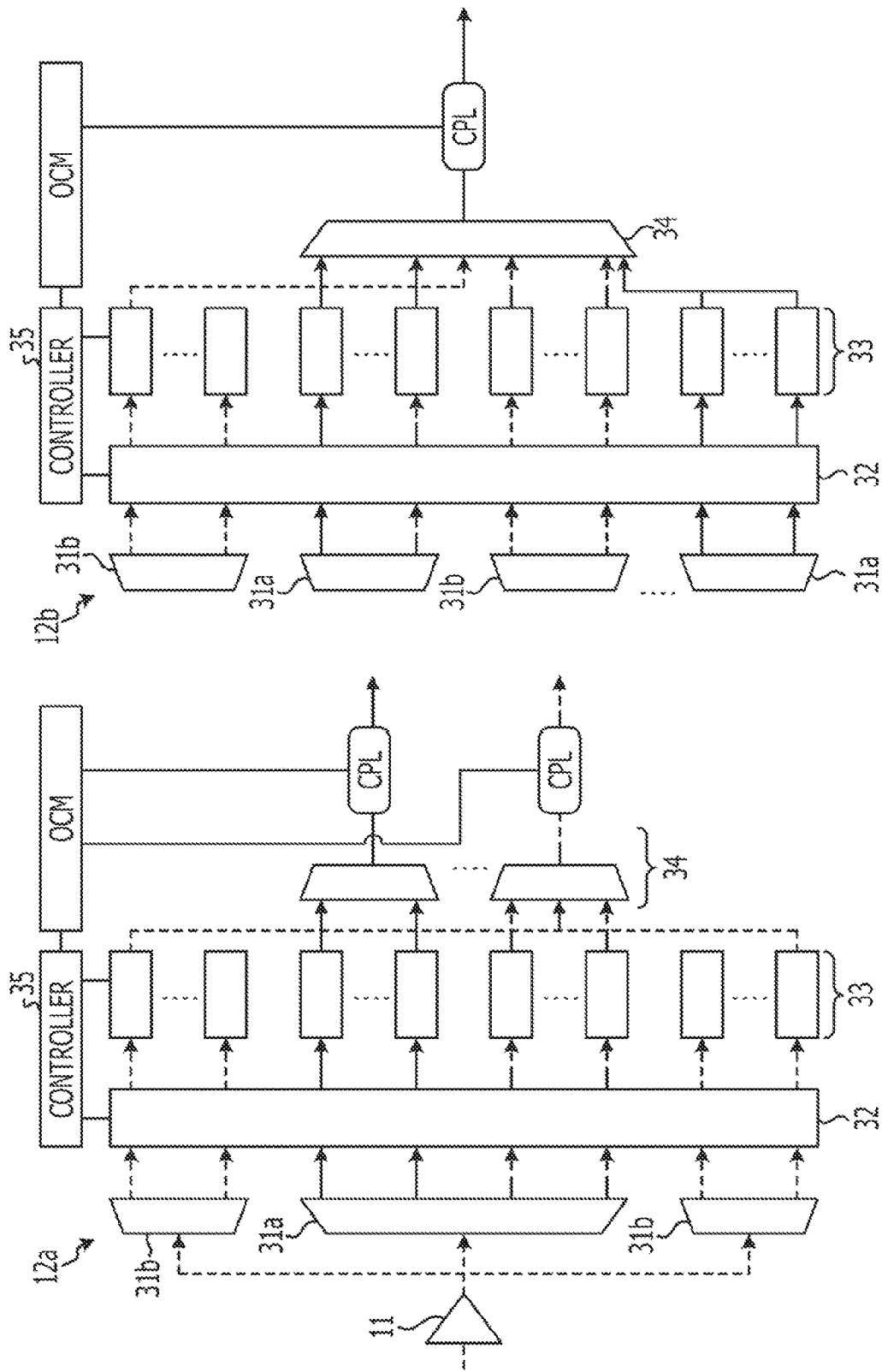
FIG. 5 is a block diagram illustrating the structure of an optical add-drop multiplexer illustrated in FIG. 3.

The detailed structure of the optical add-drop multiplexers 12 and 13 illustrated in FIG. 3 will now be described. FIG. 5 is a block diagram illustrating the structure of the optical add-drop multiplexer 12 illustrated in FIG. 3. The structure of the optical add-drop multiplexer 13 is substantially similar to that of the optical add-drop multiplexer 12, and explanations thereof are thus omitted.

As illustrated in FIG. 5, the optical add-drop multiplexer 12 includes the optical dropping section 12a and the optical adding section 12b. The optical dropping section 12a drops signal light with a specific wavelength from the WDM signal light amplified by the upstream amplifier 11. The optical adding section 12b adds signal light with a specific wavelength to the WDM signal light dropped by the optical dropping section 12a.

The optical dropping section 12a and the optical adding section 12b include demultiplexers (DMUXs) 31a and 31b, wavelength selection switches 32, variable optical attenuators (VOAs) 33, multiplexers (MUX) 34, and controllers 35.

In the optical dropping section 12a, the DMUX 31a divides the WDM signal light amplified by the upstream amplifier 11 into individual wavelengths. The DMUX 31a also divides the first ASE light into individual wavelengths, the first ASE light being a part of the ASE light generated by the upstream amplifier 11 that is in a wavelength range that is not used as that of the WDM signal light. The DMUXs 31b divide the second ASE light into individual wavelengths, the second ASE light being a part of the ASE light generated by the upstream amplifier 11 that is in a wavelength range other than the wavelength range of the WDM signal light.

In the optical dropping section 12a, the wavelength selection switch 32 selects specific wavelengths from the signal light divided into individual wavelengths by the DMUX 31a, and outputs signal light with the selected wavelengths to the MUX 34 that is connected to an operation line (the optical transmission line 21 in FIG. 3). The wavelength selection switch 32 also outputs the ASE multiplexed light, which is obtained by multiplexing the first ASE light divided into individual wavelengths by the DMUX 31a and the second ASE light divided into individual wavelengths by the DMUXs 31b, to the MUX 34 that is connected to a preliminary line (the optical transmission line 23 in FIG. 3).

The VOAs 33 adjust the signal levels of the signal light with individual wavelengths output from the wavelength selection switch 32 to appropriate levels. In addition, the VOAs 33 transmit or block the ASE multiplexed light with individual wavelengths output from the wavelength selection switch 32. The MUXs 34 perform wavelength multiplexing of the signal light with individual wavelengths and the ASE multiplexed light with individual wavelengths received from the VOAs 33, and output the wavelength-multiplexed light to the operation line (the optical transmission line 21 in FIG. 3) and the preliminary line (the optical transmission line 23 in FIG. 3).

The controllers 35 control the overall operations of the optical dropping section 12a and the optical adding section 12b. Each controller 35 is, for example, a multiple circuit such as an application specific integrated circuit (ASIC) and a field programmable gate array (FPGA), or an electronic circuit such as a central processing unit (CPU) and a micro processing unit (MPU).

For example, each controller 35 controls the wavelength selection switch 32 to output the ASE multiplexed light, which is obtained by multiplexing the first ASE light and the second ASE light, to the MUX 34 that is connected to the preliminary line. In addition, the controller 35 detects the optical power of the signal light with individual wavelengths in the operation line and the preliminary line with an optical channel monitor (OCM), and controls the VOAs 33 by using the result of the detection so as to adjust the signal levels of the light with individual wavelengths output from the wavelength selection switch 32 to appropriate levels. The controller 35 also controls the VOAs 33 such that the ASE multiplexed light with individual wavelengths output from the wavelength selection switch 32 is transmitted to the MUX 34 or is blocked.

Thus, the DMUXs 31a and 31b, the wavelength selection switches 32, the VOAs 33, the MUXs 34, and the controllers 35 operate in cooperation with each other so as to select specific wavelengths from the WDM signal light amplified by the upstream amplifier 11 and output the signal light with the selected wavelengths to the operation line. In addition, the ASE multiplexed light obtained by multiplexing the first ASE light and the second ASE light is output to the preliminary line. The first ASE light and the second ASE light are parts of the ASE light generated by the upstream amplifier 11, the first ASE light being in a wavelength range that is not selected as that of the WDM signal light, and the second ASE light being in a wavelength range other than the wavelength range of the WDM signal light.

Figure 6:
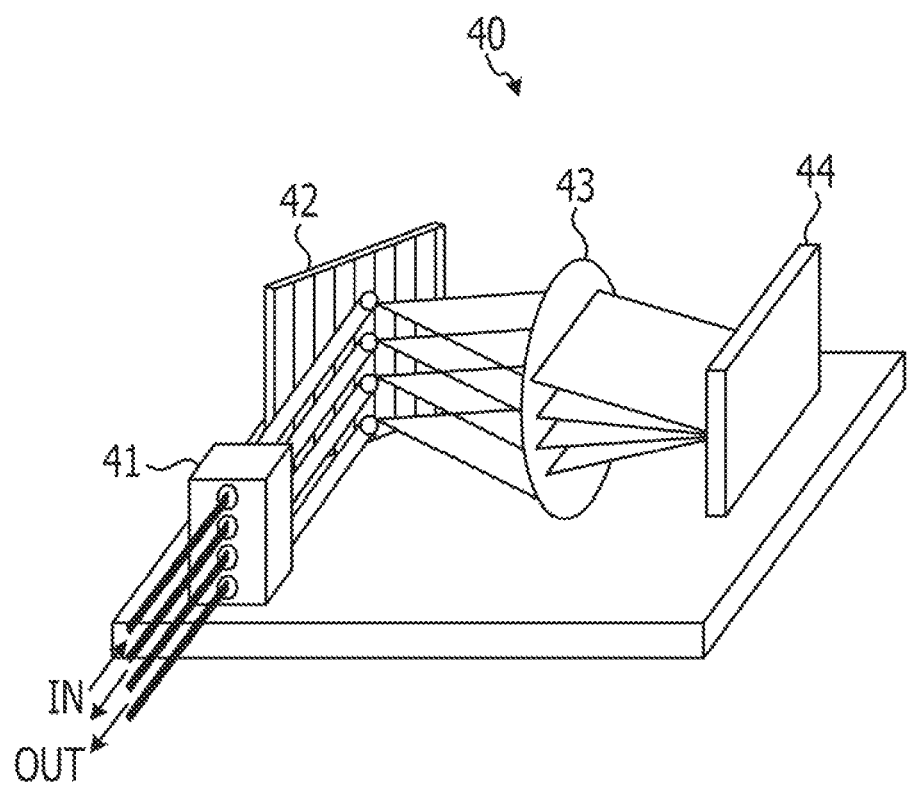
FIG. 6 is an external view illustrating the structure of a MEMS mirror device according to the second embodiment.
Figure 7:
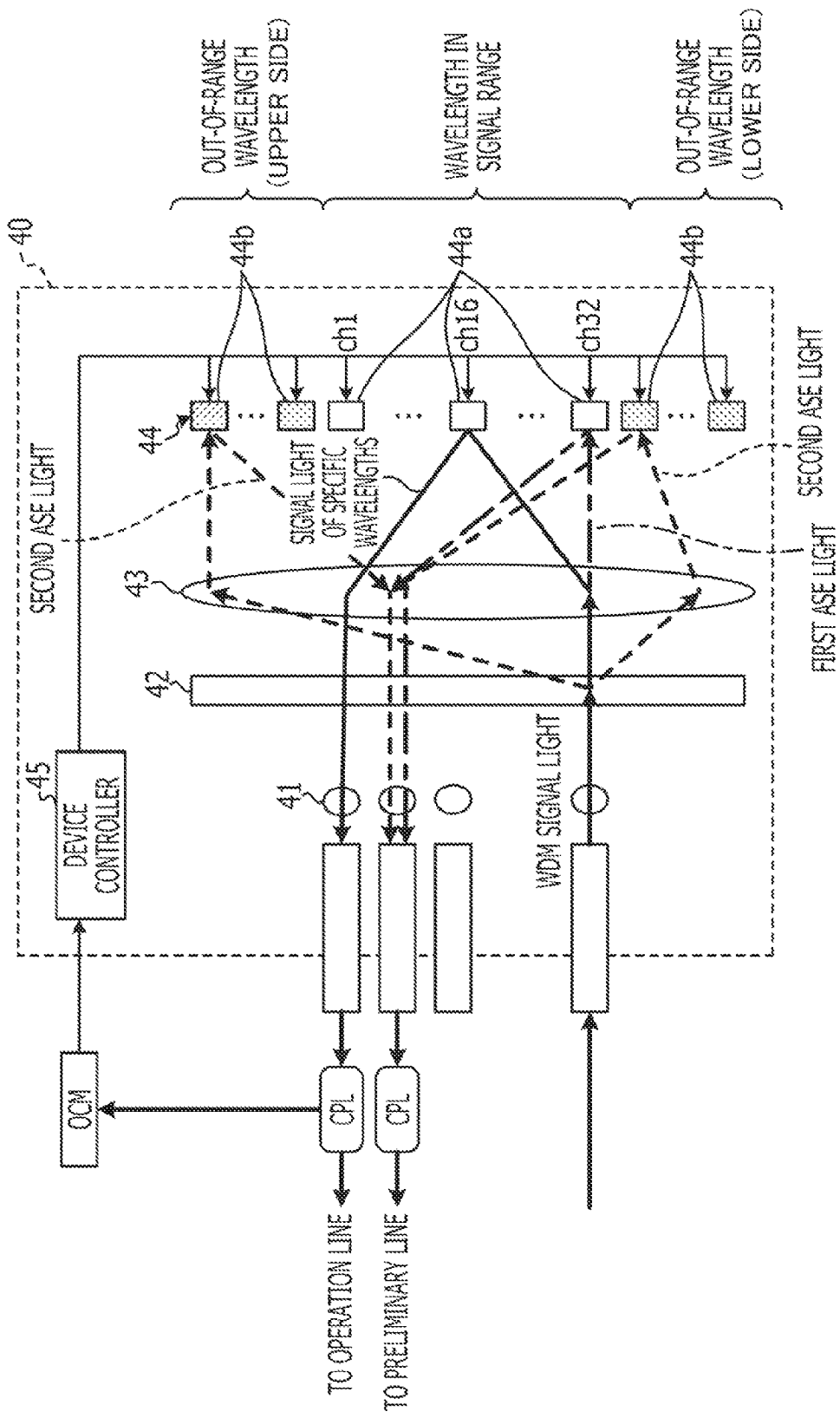
FIG. 7 is a diagram illustrating the operation of the MEMS mirror device.

In the optical dropping section 12a and the optical adding section 12b, the functions of the DMUXs 31a and 31b, the wavelength selection switches 32, the VOAs 33, the MUXs 34, and the controllers 35 may be achieved by various means. In general, these functions are achieved by micro-electromechanical systems (MEMS) mirrors. Such a MEMS mirror device will now be described. FIG. 6 is an external view illustrating the structure of a MEMS mirror device 40 according to the second embodiment. FIG. 7 is a diagram illustrating the operation of the MEMS mirror device 40.

Referring to FIGS. 6 and 7, the MEMS mirror device 40 includes a collimator 41, a diffraction grating 42, a lens 43, a MEMS mirror array 44, and a device controller 45. The collimator 41 is an optical component that forms collimated light.

The diffraction grating 42 divides the WDM signal light amplified by the upstream amplifier 11 into individual wavelengths. The diffraction grating 42 also divides the first ASE light and the second ASE light into individual wavelengths. The first ASE light and the second ASE light are parts of the ASE light generated by the upstream amplifier 11, the first ASE light being in a wavelength range that is not used as that of the WDM signal light, and the second ASE light being in a wavelength range other than the wavelength range of the WDM signal light. The lens 43 is provided to adjust the focal points of the signal light and the ASE light that are output from the diffraction grating 42 toward the MEMS mirror array 44.

The MEMS mirror array 44 includes a plurality of MEMS mirrors 44a that correspond to the wavelength range of the WDM signal light and a plurality of MEMS mirrors 44b that correspond to the ASE light in the wavelength range other than the wavelength range of the WDM signal light. In the MEMS mirror array 44, the angles of the MEMS mirrors 44a and 44b are adjusted so as to switch the operation line to which the signal light with individual wavelengths is output and the preliminary line to which the ASE light with individual wavelengths is output.

The device controller 45 controls the overall operation of the MEMS mirror device 40. For example, the device controller 45 controls the rotation angles of the MEMS mirrors 44a and 44b in the MEMS mirror array 44 to generate the ASE multiplexed light by multiplexing the ASE light with individual wavelengths that have been separated from each other by the diffraction grating 42, and outputs the ASE multiplexed light to the preliminary line. In addition, the device controller 45 detects the optical power of the signal light with individual wavelengths in the operation line and the preliminary line with an OCM, and controls the rotation angles of the MEMS mirrors 44a by using the result of the detection so as to adjust the signal level of the signal light with individual wavelengths output to the operation line to appropriate levels. The device controller 45 allows the ASE multiplexed light to travel toward the preliminary line or blocks the ASE multiplexed light by controlling the rotation angles of the MEMS mirrors 44a and 44b.

Figure 8:
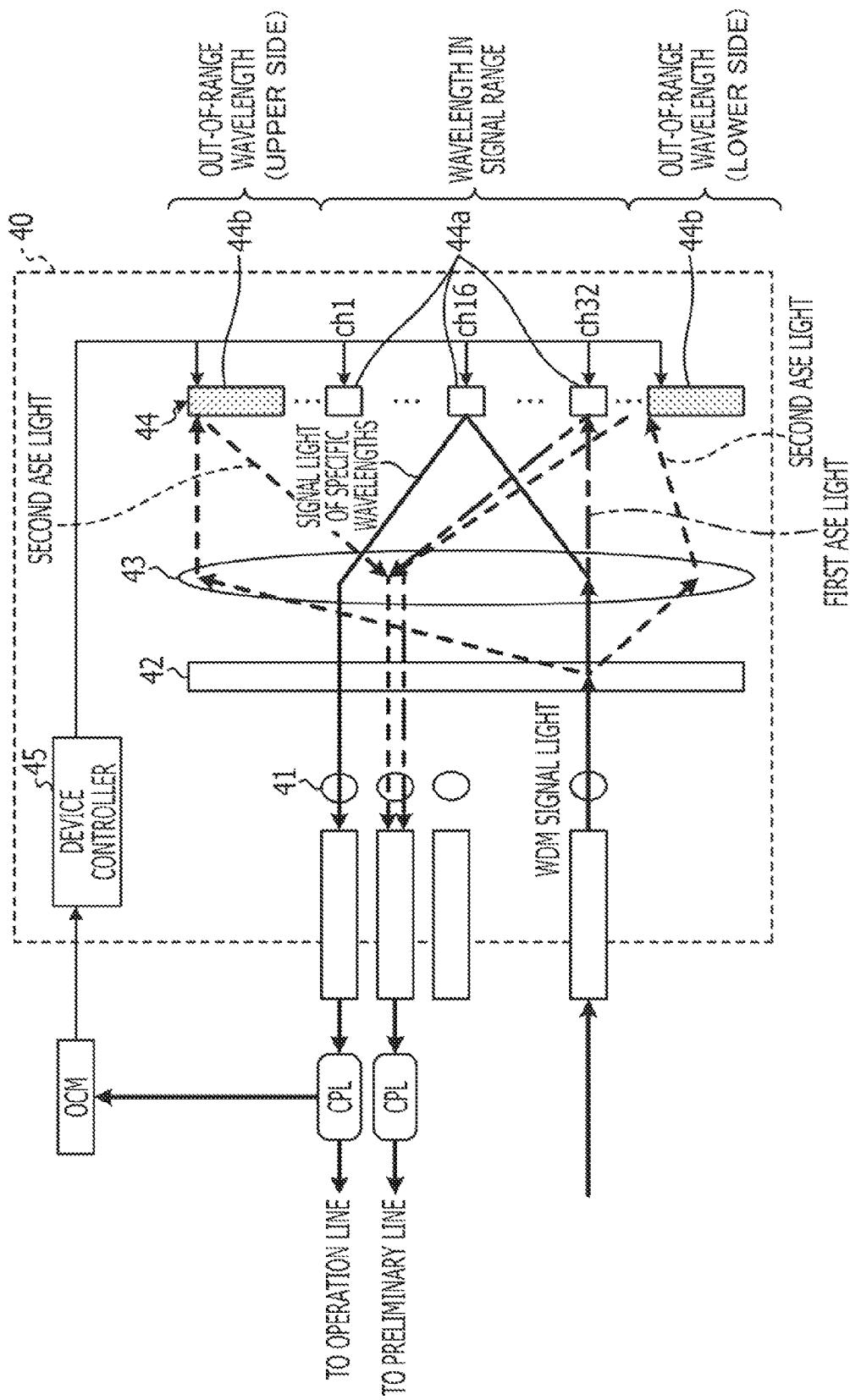
FIG. 8 is a diagram illustrating a MEMS mirror device according to a modification.

In the MEMS mirror device 40 illustrated in FIG. 7, the MEMS mirrors 44b in the MEMS mirror array 44 may be arranged in close contact with each other, as illustrated in FIG. 8. When the MEMS mirrors 44b are arranged in close contact with each other in the MEMS mirror device 40, the ASE light that leaks from between the MEMS mirrors 44b may be reduced. Therefore, the ASE light having higher optical power may be multiplexed. FIG. 8 is a diagram illustrating a modification of the MEMS mirror apparatus 40.

Figure 9:
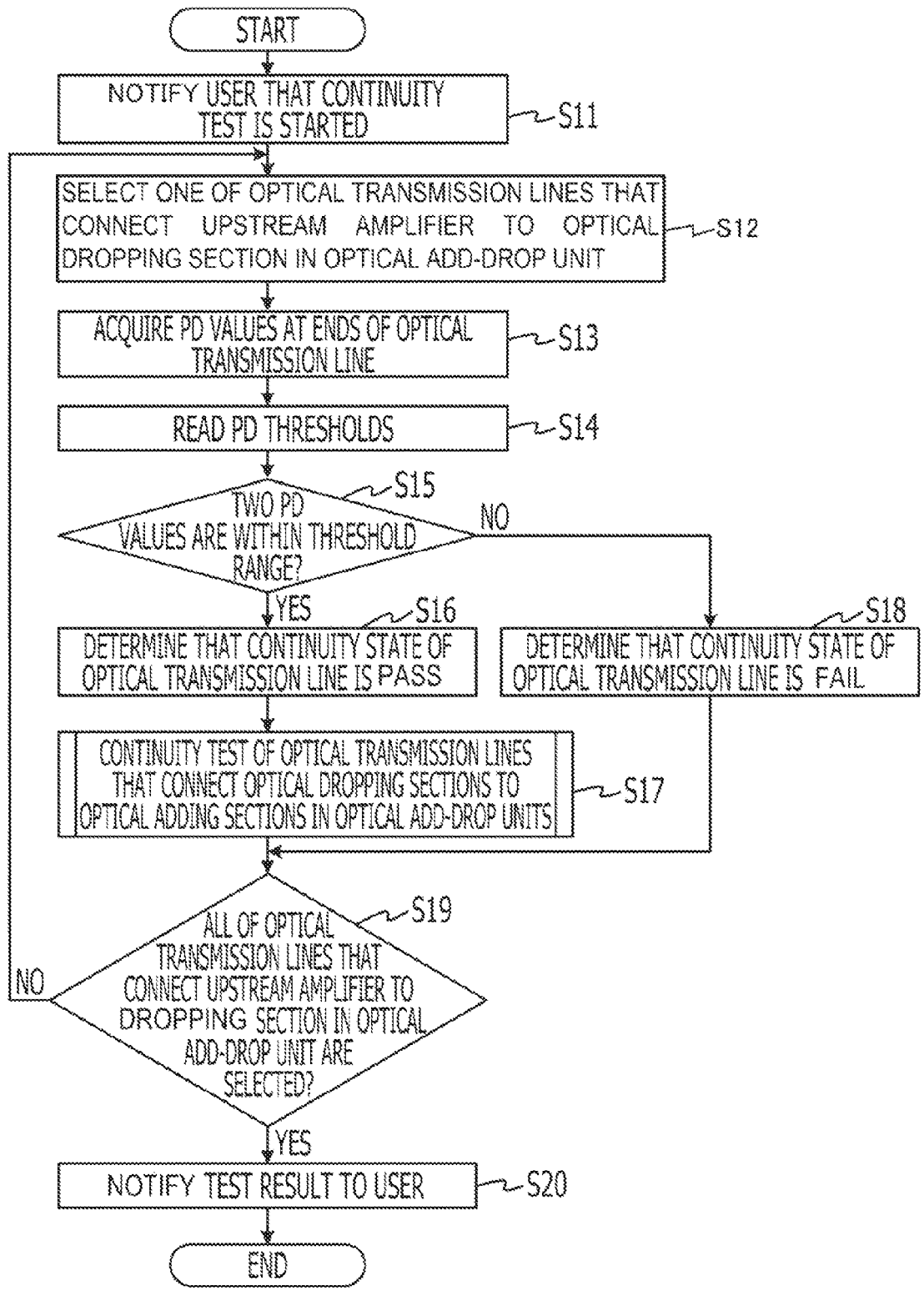
FIG. 9 is a flowchart illustrating a procedure of a continuity test performed by the optical transmission apparatus according to the second embodiment.
Figure 10:
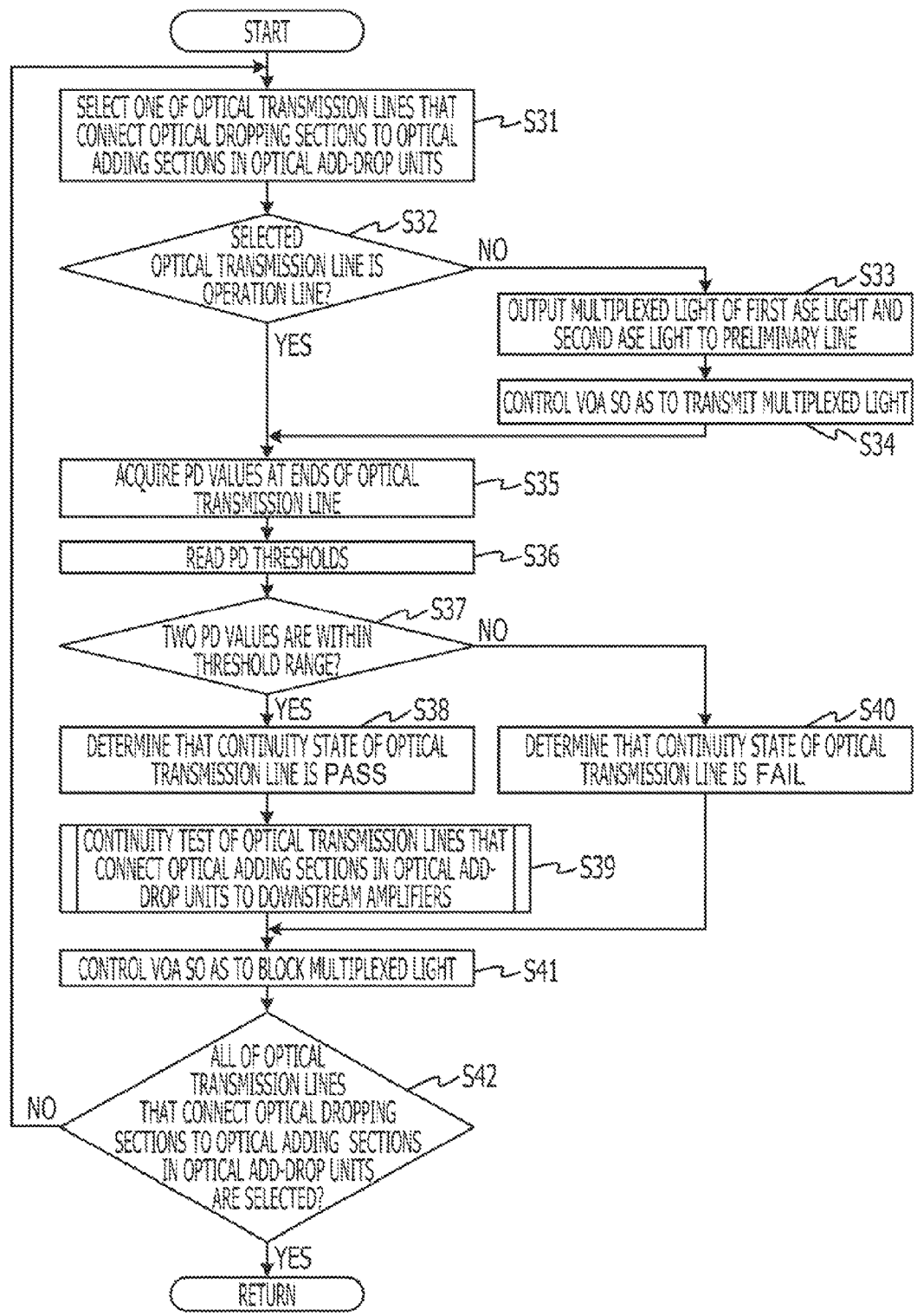
FIG. 10 is a flowchart illustrating an operation in the procedure of the continuity test performed by the optical transmission apparatus according to the second embodiment. More specifically.
Figure 11:
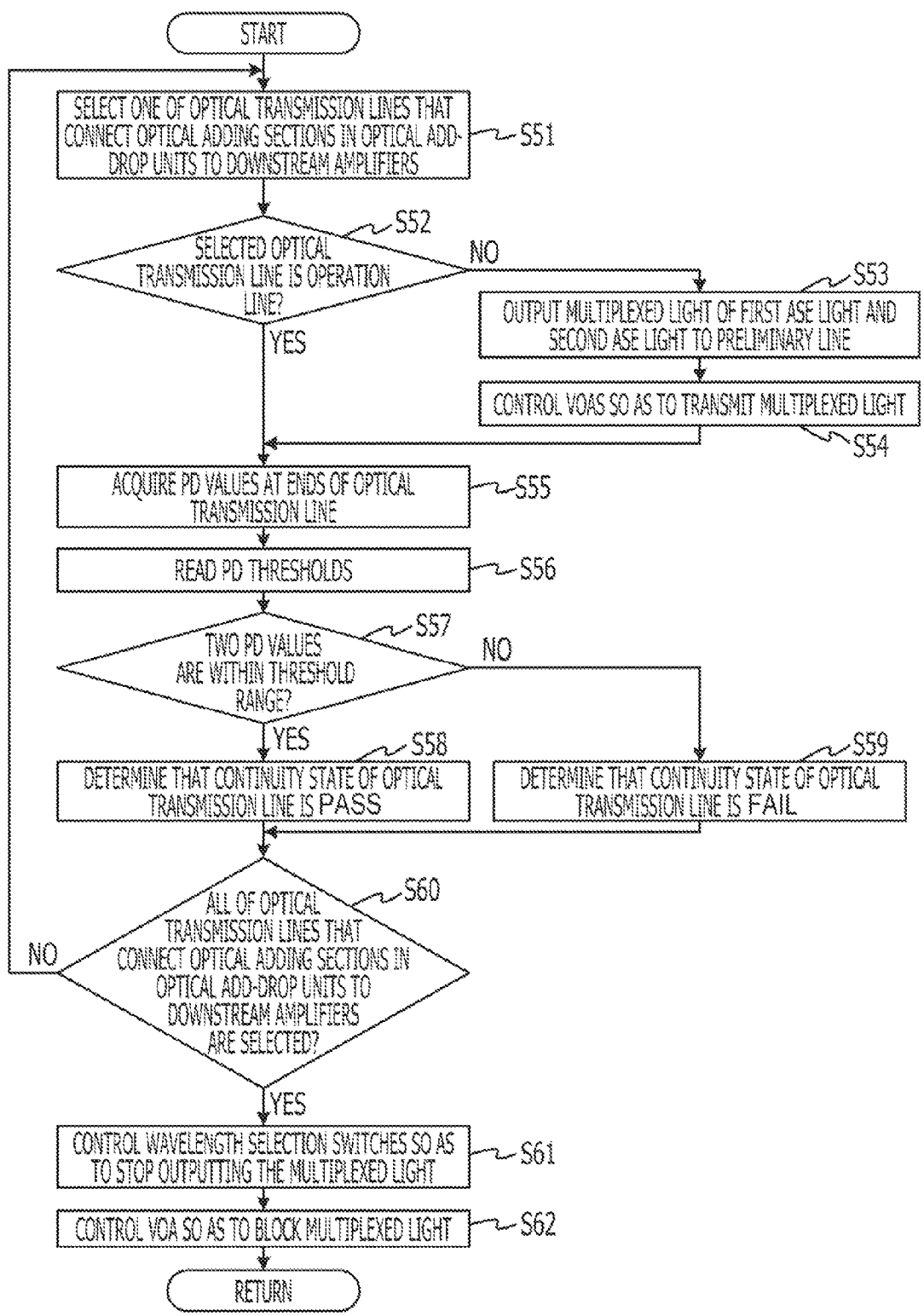
FIG. 11 is a flowchart illustrating an operation in the procedure of the continuity test performed by the optical transmission apparatus according to the second embodiment. More specifically.

The procedure of the continuity test performed by the optical transmission apparatus 10 according to the second embodiment will now be described. FIGS. 9 to 11 are flowcharts illustrating the procedure of the continuity test performed by the optical transmission apparatus 10 according to the second embodiment.

Referring to FIG. 9, the optical transmission apparatus 10 notifies the user that the continuity test is started (operation S11). The judger 16 in the optical transmission apparatus 10 selects an optical transmission line that connects the upstream amplifier 11 to the optical dropping section 12a in the optical add-drop multiplexer 12 from the optical transmission lines included in the optical transmission apparatus 10 (operation S12). Here, it is assumed that the optical transmission line 20 (see FIG. 3), which is an operation line, is selected by the judger 16 as the optical transmission line that connects the upstream amplifier 11 to the optical dropping section 12a in the optical add-drop multiplexer 12.

The judger 16 receives, from each of the PDs 20a and 20b at the ends of the optical transmission line 20, the optical power of the WDM signal light output to the optical transmission line 20 (operation S13). In addition, the judger 16 reads PD thresholds from the threshold DB 17a in the storage 17 by using the optical-transmission-line ID that corresponds to the optical transmission line 20 (operation S14).

The judger 16 determines whether or not the two optical powers (PD values) are within a PD threshold range that is defined by the PD thresholds (operation S15). If it is determined that the two optical powers are within the PD threshold range (Yes in operation S15), the judger 16 determines that the continuity state of the optical transmission line 20 is pass, and stores the information that the continuity state of the optical transmission line 20 is pass in a certain storage as a test result (operation S16). The judger 16 performs the continuity test of the optical transmission lines that connect the optical dropping sections 12a and 13a to the optical adding sections 12b and 13b in the optical add-drop multiplexers 12 and 13 (operation S17). The process performed in operation S17 will be described in detail below.

If it is determined that the two optical powers are outside the PD threshold range (No in operation S15), the judger 16 determines that the continuity state of the optical transmission line 20 is fail, and stores the information that the continuity state of the optical transmission line 20 is fail in the storage as a test result (operation S18).

After the process in operation S17 or the process in S18 is ended, the judger 16 determines whether or not all of the optical transmission lines that connect the upstream amplifier 11 to the optical dropping section 12a in the optical add-drop multiplexer 12 have been selected (operation S19). If it is determined that there are optical transmission lines that have not yet been selected (No in operation S19), the judger 16 returns to operation S12 and repeats the processes in operations S12 to S19. If it is determined that all of the optical transmission lines have been selected (Yes in operation S19), the judger 16 notifies the test results to the user (operation S20).

The process performed in operation S17 will now be described with reference to FIG. 10. Referring to FIG. 10, the judger 16 selects one of the optical transmission lines that connect the optical dropping sections 12a and 13a to the optical adding sections 12b and 13b in the optical add-drop multiplexers 12 and 13 from the optical transmission lines included in the optical transmission apparatus 10 (operation S31). Here, it is assumed that the optical transmission line 21 (see FIG. 3), which is an operation line, or the optical transmission line 23 (see FIG. 3), which is a preliminary line, is selected by the judger 16 as one of the optical transmission lines that connect the optical dropping sections 12a and 13a to the optical adding sections 12b and 13b in the optical add-drop multiplexers 12 and 13.

The judger 16 determines whether or not the selected optical transmission line is an operation line (operation S32). If it is determined by the judger 16 that the selected optical transmission line is not an operation line, that is, if the selected optical transmission line is a preliminary line (No in operation S32), the controller 35 in the optical dropping section 12a outputs the ASE multiplexed light obtained by multiplexing the first ASE light and the second ASE light to the preliminary line (operation S33). In other words, the controller 35 in the optical dropping section 12a controls the wavelength selection switch 32 so as to output the ASE multiplexed light obtained by multiplexing the first ASE light and the second ASE light to the optical transmission line 23, which is a preliminary line. In addition, the controller 35 in the optical dropping section 12a controls the VOAs 33 such that the VOAs 33 transmit the ASE multiplexed light output from the wavelength selection switch 32 (operation S34).

If the selected optical transmission line is an operation line (Yes in operation S32) or if the process in operation S34 is ended, the judger 16 receives, from each of the PDs provided at the ends of the optical transmission line, the optical power of the light output to the optical transmission line (operation S35). More specifically, the judger 16 receives the optical power of the WDM signal light output to the optical transmission line 21, which is an operation line, from each of the PDs 21a and 21b at the ends of the optical transmission line 21. Alternatively, the judger 16 receives the optical power of the ASE multiplexed light output to the optical transmission line 23, which is a preliminary line, from each of the PDs 23a and 23b at the ends of the optical transmission line 23.

The judger 16 reads PD thresholds from the threshold DB 17a in the storage 17 by using the optical-transmission-line ID that corresponds to the optical transmission line 21 or the optical transmission line 23 (operation S36). The judger 16 determines whether or not the two optical powers (PD values) are within a PD threshold range that is defined by the PD thresholds (operation S37). If it is determined that the two optical powers are within the PD threshold range (Yes in operation S37), the judger 16 determines that the continuity state of the optical transmission line 21 or 23 is pass, and stores the information that the continuity state of the optical transmission line 21 or 23 is pass in a certain storage as a test result (operation S38). The judger 16 performs the continuity test of the optical transmission lines that connect the optical adding sections 12b and 13b in the optical add-drop multiplexers 12 and 13 to the downstream amplifiers 14 and 15 (operation S39). The process performed in operation S39 will be described in detail below.

If it is determined that the two optical powers are outside the PD threshold range (No in operation S37), the judger 16 determines that the continuity state of the optical transmission line 21 or 23 is fail, and stores the information that the continuity state of the optical transmission line 21 or 23 is fail in the storage as a test result (operation S40).

After the process in operation S39 or the process in operation S40 is ended, the controller 35 in the optical dropping section 12a controls the VOAs 33 such that the VOAs 33 block the ASE multiplexed light output from the wavelength selection switch 32 (operation S41).

The judger 16 determines whether or not all of the optical transmission lines that connect the optical dropping sections 12a and 13a to the optical adding sections 12b and 13b in the optical add-drop multiplexers 12 and 13 have been selected (operation S42). If it is determined that there are optical transmission lines that have not yet been selected (No in operation S42), the judger 16 returns to operation S31 and repeats the processes in operations S31 to S42. If it is determined that all of the optical transmission lines have been selected (Yes in operation S42), the judger 16 ends the process in operation S17.

The process performed in operation S39 will now be described with reference to FIG. 11. Referring to FIG. 11, the judger 16 selects one of the optical transmission lines that connect the optical adding sections 12b and 13b in the optical add-drop multiplexers 12 and 13 to the downstream amplifiers 14 and 15 from the optical transmission lines included in the optical transmission apparatus 10 (operation S51). Here, it is assumed that the optical transmission line 22 (see FIG. 3), which is an operation line, or the optical transmission line 24 (see FIG. 3), which is a preliminary line, is selected by the judger 16 as one of the optical transmission lines that connect the optical adding sections 12b and 13b in the optical add-drop multiplexers 12 and 13 to the downstream amplifiers 14 and 15.

The judger 16 determines whether or not the selected optical transmission line is an operation line (operation S52). If it is determined by the judger 16 that the selected optical transmission line is not an operation line, that is, if the selected optical transmission line is a preliminary line (No in operation S52), the controller 35 in the optical adding section 13b outputs the ASE multiplexed light obtained by multiplexing the first ASE light and the second ASE light to the preliminary line (operation S53). In other words, the controller 35 in the optical adding section 13b controls the wavelength selection switch 32 so as to output the ASE multiplexed light obtained by multiplexing the first ASE light and the second ASE light to the optical transmission line 24, which is a preliminary line. In addition, the controller 35 in the optical adding section 13b controls the VOAs 33 such that the VOAs 33 transmit the ASE multiplexed light output from the wavelength selection switch 32 (operation S54). In this operation, owing to the previous operations S33 and S34, the ASE multiplexed light obtained by multiplexing the first ASE light and the second ASE light is being output to the optical transmission line 23 at the upstream side.

If the selected optical transmission line is an operation line (Yes in operation S52) or if the process in operation S54 is ended, the judger 16 receives, from each of the PDs provided at the ends of the optical transmission line, the optical power of the light output to the optical transmission line (operation S55). More specifically, the judger 16 receives the optical power of the WDM signal light output to the optical transmission line 22, which is an operation line, from each of the PDs 22a and 22b at the ends of the optical transmission line 22. Alternatively, the judger 16 receives the optical power of the ASE multiplexed light output to the optical transmission line 24, which is a preliminary line, from each of the PDs 24a and 24b at the ends of the optical transmission line 24.

The judger 16 reads PD thresholds from the threshold DB 17a in the storage 17 by using the optical-transmission-line ID that corresponds to the optical transmission line 22 or the optical transmission line 24 (operation S56). The judger 16 determines whether or not the two optical powers (PD values) are within a PD threshold range that is defined by the PD thresholds (operation S57). If it is determined that the two optical powers are within the PD threshold range (Yes in operation S57), the judger 16 determines that the continuity state of the optical transmission line 22 or 24 is pass, and stores the information that the continuity state of the optical transmission line 22 or 24 is pass in a certain storage as a test result (operation S58).

If it is determined that the two optical powers are outside the PD threshold range (No in operation S57), the judger 16 determines that the continuity state of the optical transmission line 22 or 24 is fail, and stores the information that the continuity state of the optical transmission line 22 or 24 is fail in the storage as a test result (operation S59).

After the process in operation S58 or the process in operation S59 is ended, the judger 16 determines whether or not all of the optical transmission lines that connect the optical adding sections 12b and 13b in the optical add-drop multiplexers 12 and 13 to the downstream amplifiers 14 and 15 have been selected (operation S60). If it is determined that there are optical transmission lines that have not yet been selected (No in operation S60), the judger 16 returns to operation S51 and repeats the processes in operations S51 to S60. If it is determined that all of the optical transmission lines have been selected (Yes in operation S60), the judger 16 proceeds to operation S61.

In operation S61, the controller 35 in the optical dropping section 12a controls the wavelength selection switch 32 so as to stop outputting the ASE multiplexed light to the optical transmission line 23, which is a preliminary line. In addition, the controller 35 in the optical adding section 13b controls the wavelength selection switch 32 so as to stop outputting the ASE multiplexed light to the optical transmission line 24, which is a preliminary line (operation S61). The controller 35 in the optical adding section 13*b* controls the VOAs 33 so as to block the ASE multiplexed light output from the wavelength selection switch 32 (operation S62), and the process in operation S39 is ended.

As described above, the optical transmission apparatus 10 according to the second embodiment includes a plurality of optical transmission lines, and the WDM signal light is output to some of the optical transmission lines that are preset as the operation lines. In addition, the optical transmission apparatus 10 judges the continuity states of the preliminary lines by outputting the ASE multiplexed light obtained by multiplexing the first ASE light and the second ASE light to the preliminary lines. The first ASE light and the second ASE light are parts of the ASE light from the upstream amplifier 11, the first ASE light being in the wavelength range that is not output to the operation lines, and the second ASE light being in the wavelength range other than the wavelength range of the WDM signal light.

Therefore, according to the optical transmission apparatus 10 of the second embodiment, the continuity of the preliminary lines may be checked without stopping the WDM signal light that is being output to the operation lines. As a result, according to the optical transmission apparatus 10 of the second embodiment, the continuity test of the optical transmission lines in the apparatus may be easily performed while maintaining the communication stability.

In the optical transmission apparatus 10 according to the second embodiment, the functions of the DMUXs 31*a* and 31*b*, the wavelength selection switches 32, the VOAs 33, the MUXs 34, and the controllers 35 may be provided by a single MEMS mirror device 40. More specifically, the diffraction grating 42 in the MEMS mirror device 40 divides the first ASE light and the second ASE light into individual wavelengths. In addition, the MEMS mirror array 44 adjusts the angles of the MEMS mirrors to switch the preliminary lines to which the first ASE light and the second ASE light with individual wavelengths that are separated from each other by the diffraction grating 42 are output.

Therefore, according to the optical transmission apparatus 10 of the second embodiment, the structure for performing the continuity test of the optical transmission lines in the apparatus may be simplified and the overall size of the apparatus may be reduced.

In the optical transmission apparatus 10 according to the second embodiment, the MEMS mirrors 44*b* in the MEMS mirror array 44 included in the MEMS mirror device 40 may be arranged in close contact with each other. In such a case, in the optical transmission apparatus 10 according to the second embodiment, the ASE light that leaks from between the MEMS mirrors 44*b* may be reduced. Therefore, the ASE light having higher optical power may be multiplexed and output to the preliminary line. As a result, in the optical transmission apparatus 10 of the second embodiment, the continuity test of the preliminary lines may be more accurately performed.

In the optical transmission apparatus 10 according to the second embodiment, the judger 16 receives the optical power of the ASE multiplexed light output to each preliminary line at both ends of the preliminary line, and judges the continuity state of the preliminary line by determining whether or not the two optical powers obtained at the ends of the preliminary line are within a specific threshold range. Therefore, according to the optical transmission apparatus 10 of the second embodiment, the optical power of the ASE multiplexed light may be detected by PDs having a standard detection accuracy, and it is unnecessary to use PDs having a high detection accuracy. As a result, the continuity test of the preliminary lines may be performed at a low cost.

An optical transmission apparatus according to a third embodiment will now be described. Components having structures substantially similar to those of the above-described components are denoted by the same reference numerals, and explanations thereof are thus omitted.

Figure 12:
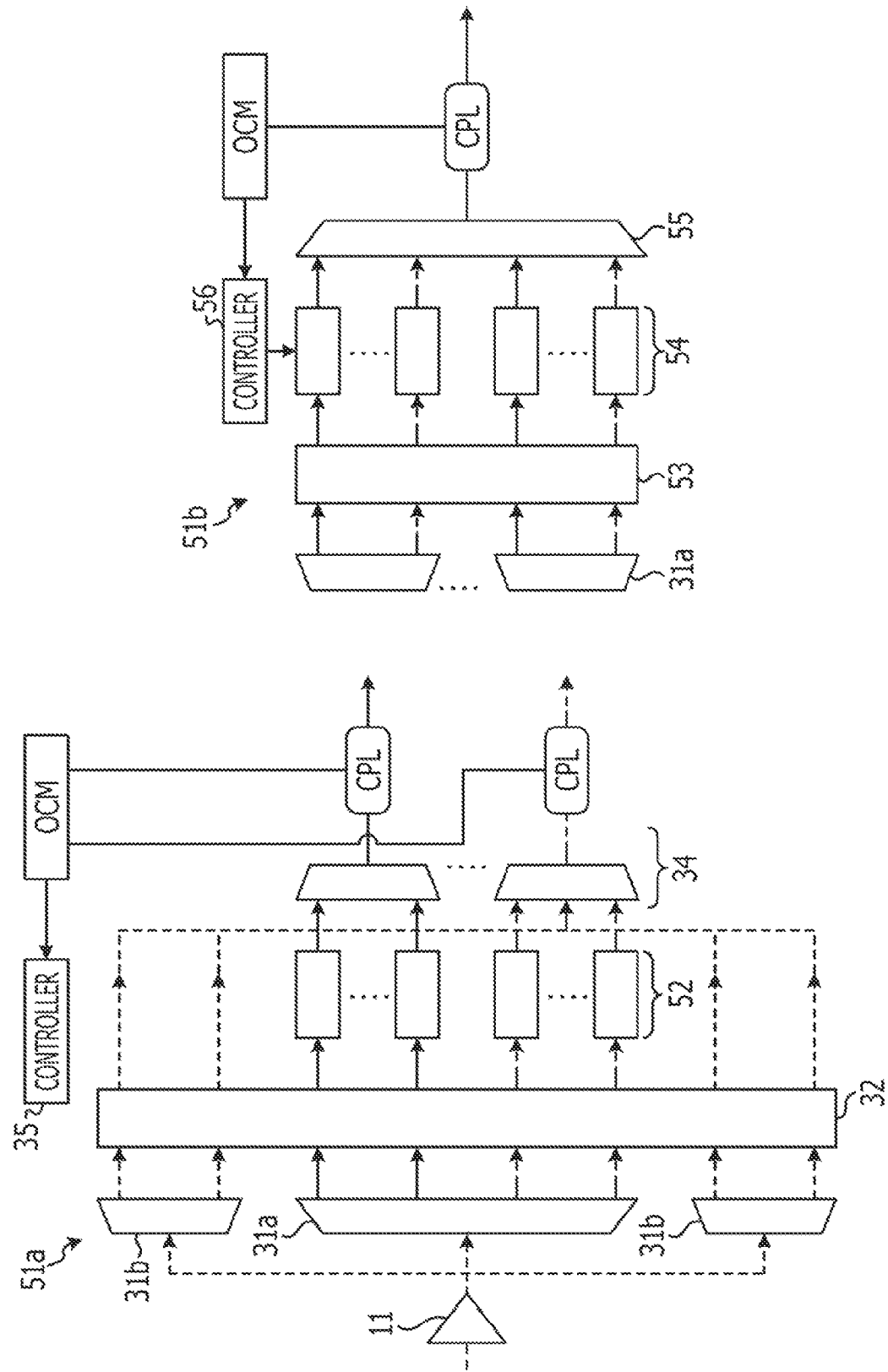
FIG. 12 is a block diagram illustrating the structure of an optical add-drop multiplexer included in an optical transmission apparatus according to a third embodiment.

The optical transmission apparatus according to the third embodiment differs from the optical transmission apparatus 10 according to the second embodiment in that the structure of the optical add-drop multiplexers is simplified. FIG. 12 is a block diagram illustrating the structure of an optical add-drop multiplexer included in the optical transmission apparatus according to the third embodiment.

As illustrated in FIG. 12, the optical add-drop multiplexer according to the third embodiment includes an optical dropping section 51*a* and an optical adding section 51*b*. The optical dropping section 51*a* drops signal light with a specific wavelength from the WDM signal light amplified by the upstream amplifier 11. The optical adding section 51*b* adds signal light with a specific wavelength to the WDM signal light dropped by the optical dropping section 51*a*.

The optical dropping section 51*a* includes DMUXs 31*a* and 31*b*, a wavelength selection switch 32, VOAs 52, MUXs 34, and a controller 35. The optical adding section 51*b* includes DMUXs 31*a*, a wavelength selection switch 53, VOAs 54, an MUX 55, and a controller 56.

The VOAs 52 in the optical dropping section 51*a* adjust the signal levels of the signal light with individual wavelengths output from the wavelength selection switch 32 to appropriate levels. The VOAs 52 transmit or block the ASE multiplexed light (ASE multiplexed light obtained by multiplexing the first ASE light) with individual wavelengths output from the wavelength selection switch 32.

In the optical adding section 51*b*, the wavelength selection switch 53 selects specific wavelengths from the signal light divided into individual wavelengths by the DMUX 31*a*, and outputs signal light with the selected wavelengths to the MUX 55 that is connected to an operation line (the optical transmission line 22 in FIG. 3). The wavelength selection switch 53 also outputs the ASE multiplexed light, which is obtained by multiplexing the first ASE light divided into individual wavelengths by the DMUX 31*a*, to the MUX 55 that is connected to a preliminary line (the optical transmission line 24 in FIG. 3).

The VOAs 54 adjust the signal levels of the signal light with individual wavelengths output from the wavelength selection switch 53 to appropriate levels. In addition, the VOAs 54 transmit or block the ASE multiplexed light with individual wavelengths output from the wavelength selection switch 53. The MUX 55 performs wavelength multiplexing of the signal light with individual wavelengths and the ASE multiplexed light with individual wavelengths received from the VOAs 54, and outputs the wavelength-multiplexed light to the operation line (the optical transmission line 22 in FIG. 3) and the preliminary line (the optical transmission line 24 in FIG. 3).

In the optical adding section 51*b*, the controller 56 controls the overall operation of the optical adding section 51*b*. For example, the controller 56 controls the wavelength selection switch 53 to output the ASE multiplexed light obtained by multiplexing the first ASE light to the MUX 55 that is connected to the preliminary line. In addition, the controller 56 detects the optical power of the signal light with individual wavelengths in the operation line and the preliminary line with an OCM and controls the VOAs 54 by using the result of the detection so as to adjust the signal levels of the light with individual wavelengths output from the wavelength selection switch 53 to appropriate levels. The controller 56 also controls the VOAs 54 such that the ASE multiplexed light with individual wavelengths output from the wavelength selection switch 53 is transmitted toward the MUX 55 or is blocked.

In the optical dropping section 51a, the DMUXs 31a and 31b, the wavelength selection switch 32, the VOAs 52, the MUXs 34, and the controller 35 operate in cooperation with each other so as to select specific wavelengths from the WDM signal light amplified by the upstream amplifier 11 and output the signal light with the selected wavelengths to the operation line. In addition, the ASE multiplexed light obtained by multiplexing the first ASE light and the second ASE light is output to the preliminary line. The first ASE light and the second ASE light are parts of the ASE light generated by the upstream amplifier 11, the first ASE light being in a wavelength range that is not selected as that of the WDM signal light, and the second ASE light being in a wavelength range other than the wavelength range of the WDM signal light.

In the optical adding section 51b, the DMUXs 31a, the wavelength selection switch 53, the VOAs 54, the MUX 55, and the controller 56 operate in cooperation with each other so as to select specific wavelengths from the WDM signal light amplified by the upstream amplifier 11 and output the signal light with the selected wavelengths to the operation line. In addition, the ASE multiplexed light obtained by multiplexing the first ASE light is output to the preliminary line, the first ASE light being the part of the ASE light generated by the upstream amplifier 11 that is in a wavelength range that is not selected as that of the WDM signal light.

Figure 13:
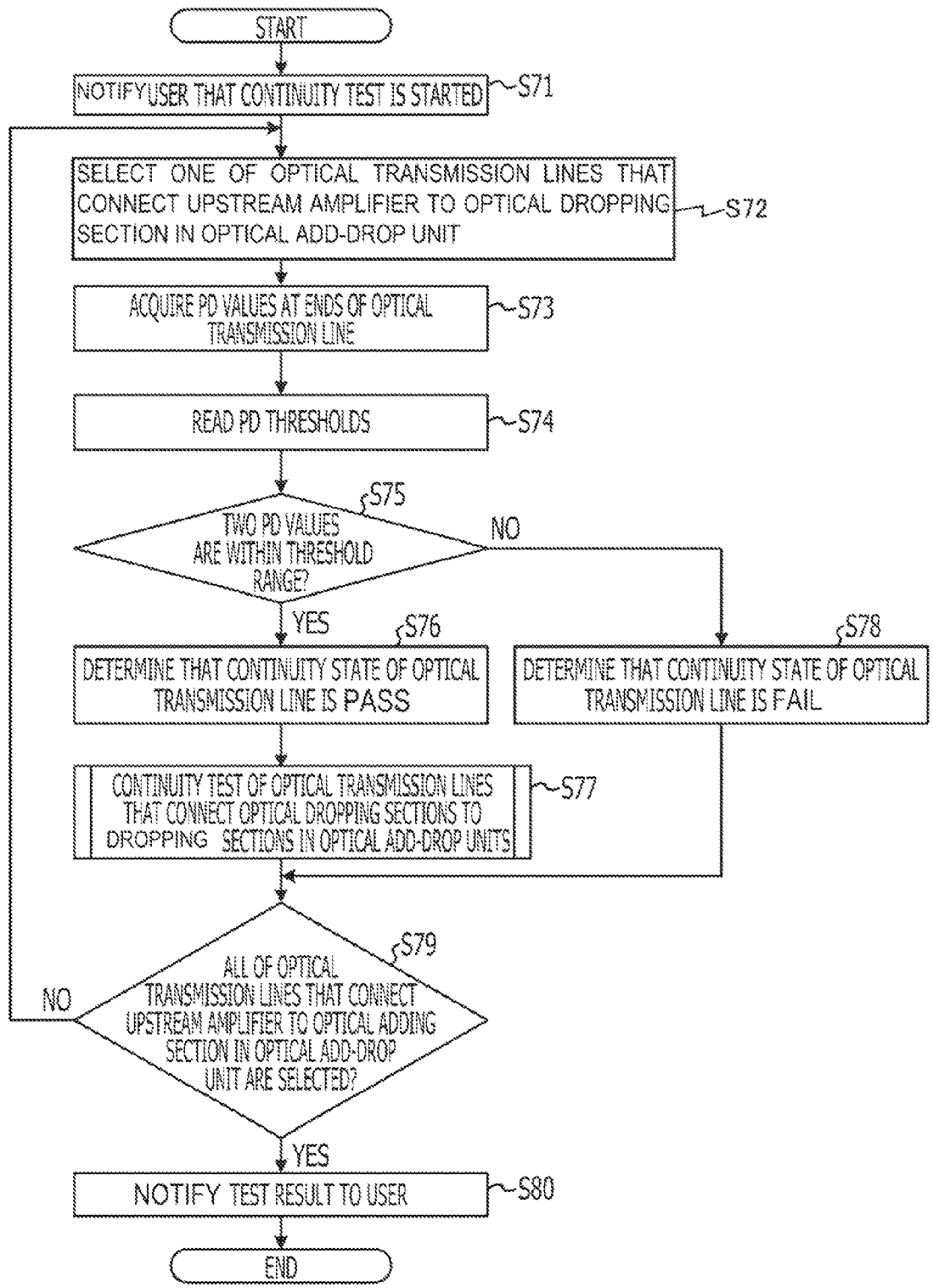
FIG. 13 is a flowchart illustrating a procedure of a continuity test performed by the optical transmission apparatus according to the third embodiment.
Figure 14:
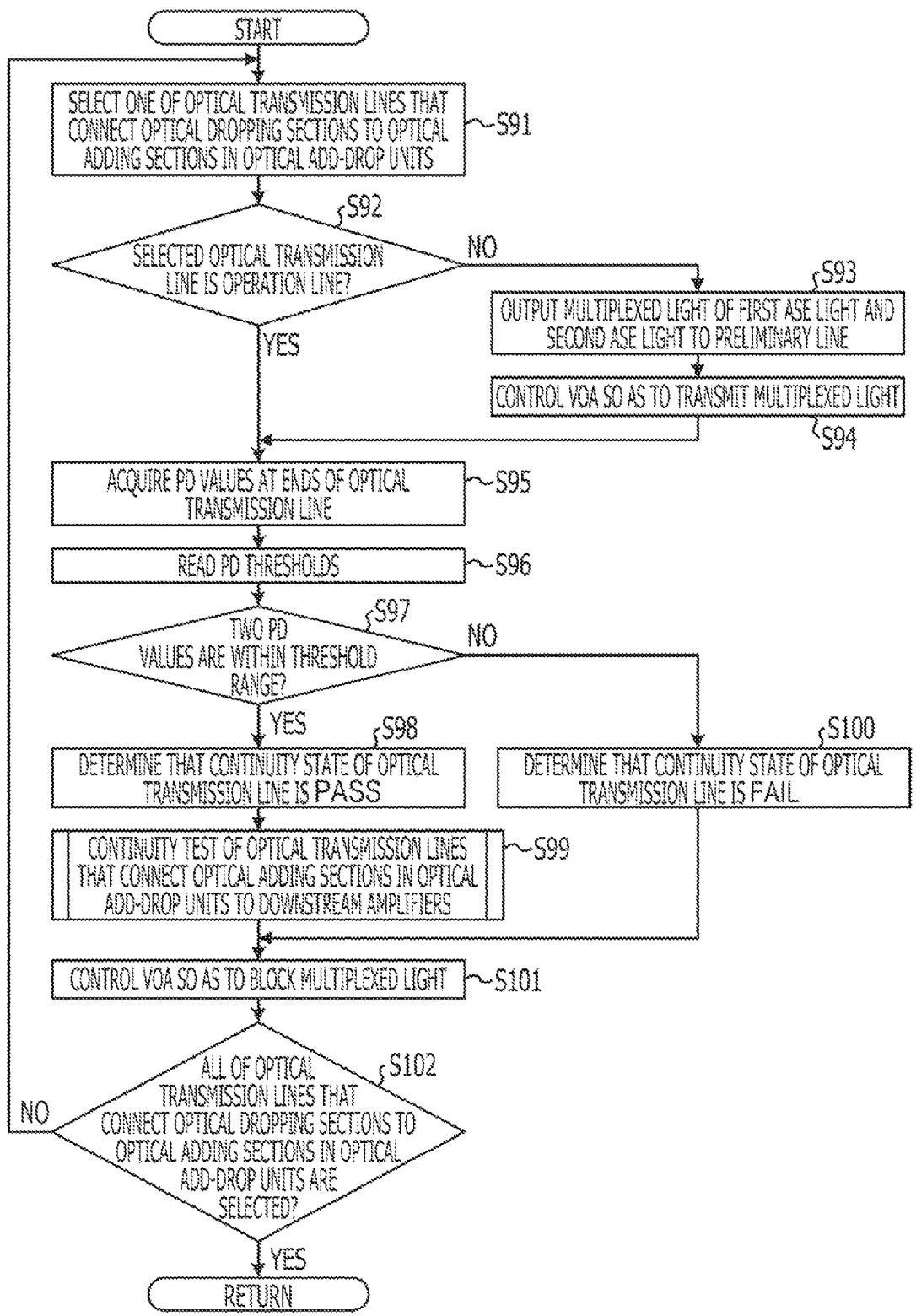
FIG. 14 is a flowchart illustrating an operation in the procedure of the continuity test performed by the optical transmission apparatus according to the third embodiment. More specifically.
Figure 15:
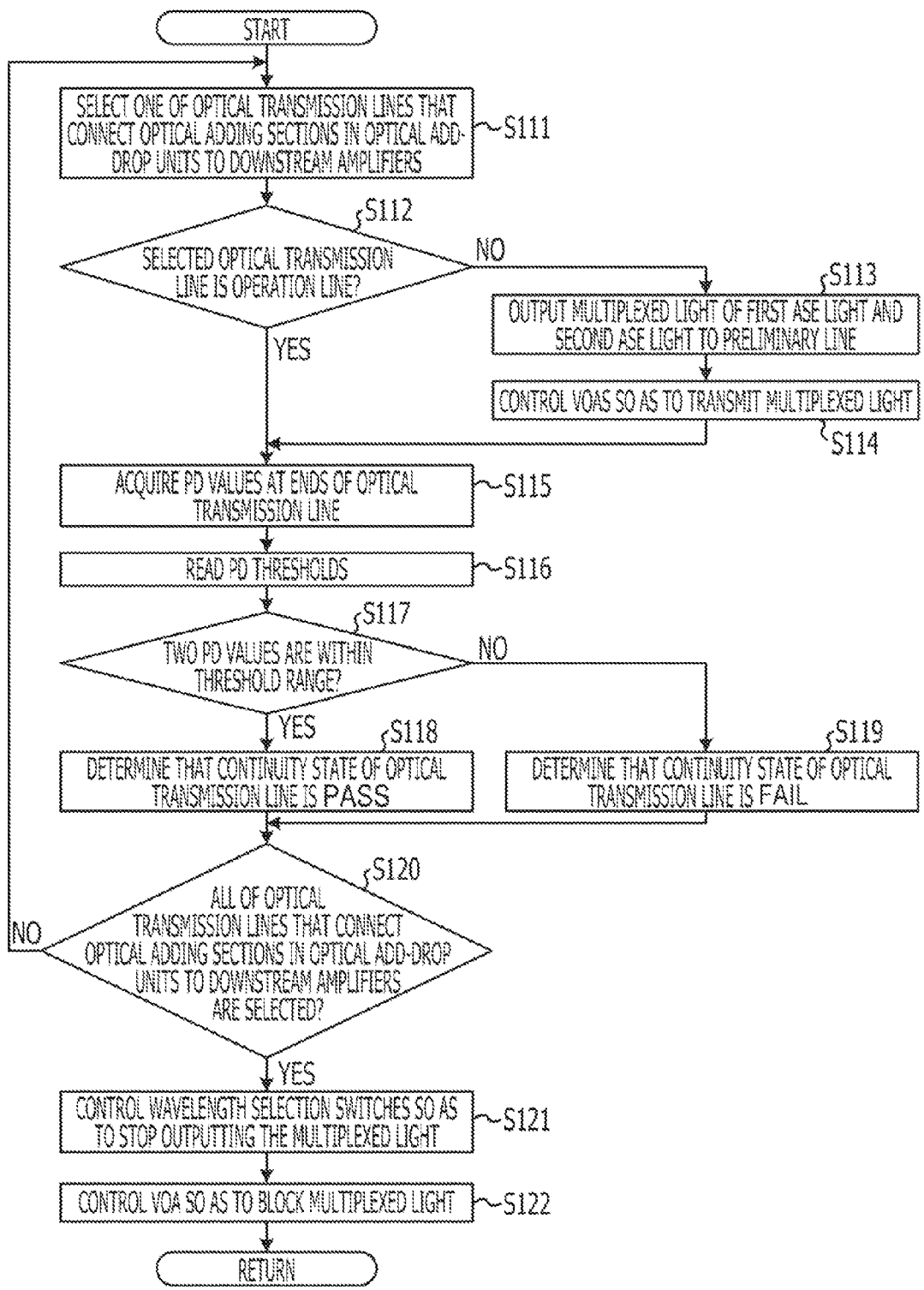
FIG. 15 is a flowchart illustrating an operation in the procedure of the continuity test performed by the optical transmission apparatus according to the third embodiment. More specifically.

The procedure of the continuity test performed by the optical transmission apparatus according to the third embodiment will now be described. FIGS. 13 to 15 are flowcharts illustrating a procedure of the continuity test performed by the optical transmission apparatus according to the third embodiment. Here, descriptions of operations (operations S71 to S76 and S78 to S80) that are substantially similar to the operations in the procedure of the second embodiment described with reference to FIG. 9 will be omitted.

Referring to FIG. 13, if the continuity test is started and it is determined that the continuity state of the optical transmission line 20 is normal (operations S71 to S76), the judger 16 performs the continuity test of the optical transmission lines that connect the optical dropping section 51a to the optical adding section 51b in the optical add-drop multiplexer (operation S77). When all of the optical transmission lines that connect the upstream amplifier 11 to the optical dropping section 51a in the optical add-drop multiplexer have been selected, the test results are presented to the user (operations S78 to S80).

The process performed in operation S77 will now be described with reference to FIG. 14. Here, descriptions of operations (operations S91 to S93, S95 to S98, S100, and S102) that are substantially similar to the operations in the procedure of the second embodiment described with reference to FIG. 10 will be omitted.

Referring to FIG. 14, the ASE multiplexed light obtained by multiplexing the first ASE light and the second ASE light is output to the preliminary lines (operation S93). After that, in operation S94, the controller 35 in the optical dropping section 51a controls the VOAs 52 such that the VOAs 52 transmit the ASE multiplexed light output from the wavelength selection switch 32 (operation S94).

When it is determined that the continuity state of the optical transmission line 21 or the optical transmission line 23 is pass (operation S98), the judger 16 performs the continuity test of the optical transmission lines that connect the optical adding section 51b in the optical add-drop multiplexer to the downstream amplifiers 14 and 15 (operation S99). The process performed in operation S99 will be described in detail below.

After the process in operation S99 or the process in operation S100 is ended, the controller 35 in the optical dropping section 52a controls the VOAs 52 such that the VOAs 52 block the ASE multiplexed light output from the wavelength selection switch 32 (operation S101).

The process performed in operation S99 will now be described with reference to FIG. 15. Here, descriptions of operations (operations S111, S112, and S115 to S120) that are substantially similar to the operations in the procedure of the second embodiment described with reference to FIG. 11 will be omitted.

Referring to FIG. 15, if it is determined that the selected optical transmission line is not an operation line, that is, if the selected optical transmission line is a preliminary line (No in operation S112), the controller 56 in the optical adding section 51b outputs the ASE multiplexed light obtained by multiplexing the first ASE light to the preliminary line (operation S113). In other words, the controller 56 in the optical adding section 51b controls the wavelength selection switch 53 so as to output the ASE multiplexed light obtained by multiplexing the first ASE light to the optical transmission line 24, which is a preliminary line. In addition, the controller 56 in the optical adding section 51b controls the VOAs 54 such that the VOAs 54 transmit the ASE multiplexed light output from the wavelength selection switch 53 (operation S114).

After the process in operation S120 is ended, the controller 35 in the optical dropping section 51a controls the wavelength selection switch 32 so as to stop outputting the ASE multiplexed light to the optical transmission line 23, which is a preliminary line. In addition, the controller 56 in the optical adding section 51b controls the wavelength selection switch 53 so as to stop outputting the ASE multiplexed light to the optical transmission line 24, which is a preliminary line (operation S121). The controller 56 in the optical adding section 51b controls the VOAs 54 so as to block the ASE multiplexed light output from the wavelength selection switch 53 (operation S122), and the process in operation S99 is ended.

As described above, in the optical transmission apparatus according to the third embodiment, the optical adding section 51b outputs the ASE multiplexed light obtained by multiplexing the first ASE light to the preliminary line, the first ASE light being the part of the ASE light generated by the upstream amplifier 11 that is in the wavelength range that is not selected as that of the WDM signal light.

Therefore, according to the optical transmission apparatus of the third embodiment, when the optical power of the first ASE light is sufficiently high compared to that of the second ASE light, the continuity test of the preliminary lines may be performed using the ASE multiplexed light obtained by multiplexing mainly the first ASE light. Thus, according to the optical transmission apparatus of the third embodiment, when the optical power of the first ASE light is sufficiently high compared to that of the second ASE light, components for multiplexing the second ASE light may be omitted from the optical adding section 51b. As a result, the cost of the device may be reduced.

In the second embodiment, the optical power of the ASE multiplexed light output to each preliminary line is detected at both ends of the preliminary line, and the continuity state of the preliminary line is judged by determining whether or not the two optical powers are within a threshold range. However, alternatively, the continuity state may be judged by evaluating the difference between the two optical powers with thresholds. Accordingly, in a fourth embodiment, the optical power of the ASE multiplexed light output to each preliminary line is obtained at both ends of the preliminary line, and the continuity state of the preliminary line is judged by determining whether or not the difference between the two optical powers is within a specific threshold range.

Figure 16:
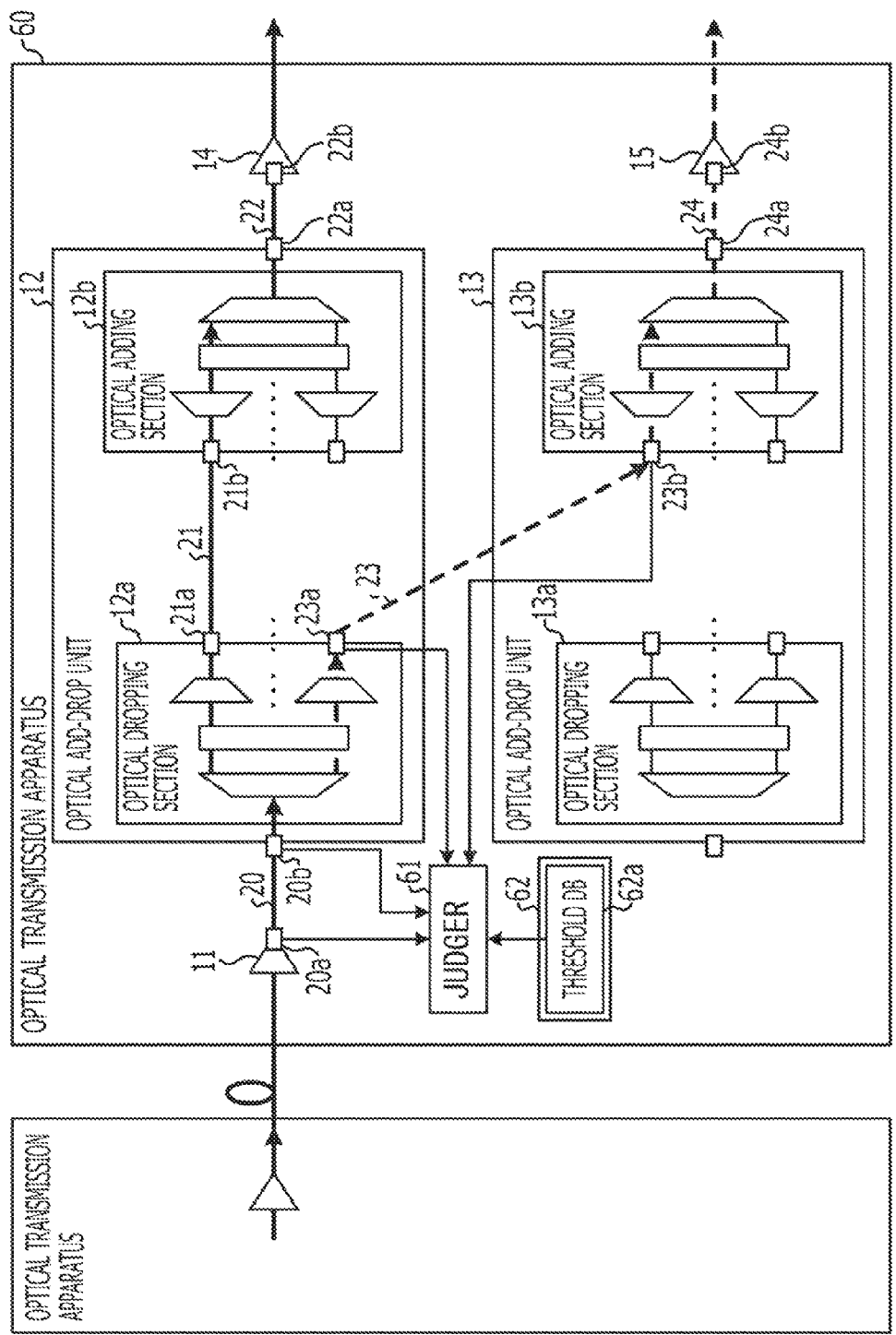
FIG. 16 is a block diagram illustrating the structure of an optical transmission apparatus according to a fourth embodiment.

The structure of an optical transmission apparatus according to the fourth embodiment will now be described. FIG. 16 is a block diagram illustrating the structure of an optical transmission apparatus 60 according to the fourth embodiment. Components having structures substantially similar to those of the above-described components are denoted by the same reference numerals, and explanations thereof are thus omitted. As illustrated in FIG. 16, the optical transmission apparatus 60 includes a judger 61 and a storage 62 in place of the judger 16 and the storage 17, respectively, in the optical transmission apparatus 10 illustrated in FIG. 3.

The judger 61 judges the continuity states of the optical transmission lines 20, 21, and 22, which are operation lines, by using the WDM signal light output to the optical transmission lines 20, 21, and 22 from the upstream amplifier 11, the optical dropping section 12a in the optical add-drop multiplexer 12, and the optical adding section 12b in the optical add-drop multiplexer 12, respectively. More specifically, the judger 61 receives the optical power of the WDM signal light output to the optical transmission line 20 from each of the PDs 20a and 20b provided at the ends of the optical transmission line 20, and judges the continuity state of the optical transmission line 20 by determining whether or not the difference between the two optical powers is within a specific threshold range. In addition, the judger 61 receives the optical power of the WDM signal light output to the optical transmission line 21 from each of the PDs 21a and 21b provided at the ends of the optical transmission line 21, and judges the continuity state of the optical transmission line 21 by determining whether or not the difference between the two optical powers is within a specific threshold range. The judger 61 receives the optical power of the WDM signal light output to the optical transmission line 22 from each of the PDs 22a and 22b provided at the ends of the optical transmission line 22, and judges the continuity state of the optical transmission line 22 by determining whether or not the difference between the two optical powers is within a specific threshold range.

The judger 61 also judges the continuity states of the optical transmission lines 23 and 24, which are preliminary lines, by using the ASE multiplexed light output to the optical transmission lines 23 and 24 from the optical dropping section 12a in the optical add-drop multiplexer 12 and the optical adding section 13b in the optical add-drop multiplexer 13, respectively. More specifically, the judger 61 receives the optical power of the ASE multiplexed light output to the optical transmission line 23 from each of the PDs 23a and 23b provided at the ends of the optical transmission line 23, and judges the continuity state of the optical transmission line 23 by determining whether or not the difference between the two optical powers is within a specific threshold range. The judger 61 receives the optical power of the ASE multiplexed light output to the optical transmission line 24 from each of the PDs 24a and 24b provided at the ends of the optical transmission line 24, and judges the continuity state of the optical transmission line 24 by determining whether or not the difference between the two optical powers is within a specific threshold range.

The storage 62 stores data used in the judging process performed by the judger 61. The storage 62 includes, in particular, a threshold DB 62a. The threshold DB 62a stores PD thresholds referred to by the judger 61 when the judger 61 determines whether or not the difference between the optical powers of the WDM signal light or the ASE multiplexed light output to the optical transmission lines is within a specific threshold range. FIG. 17 illustrates an example of the threshold DB 62a.

Referring to FIG. 17, the threshold DB 62a stores optical-transmission-line IDs in association with the PD thresholds. The optical-transmission-line IDs are the identification information for identifying the optical transmission lines. The PD thresholds define the threshold range (upper and lower limit values) for the difference between the PDs disposed at the ends of each optical transmission line.

As described above, in the optical transmission apparatus 60 according to the fourth embodiment, the optical power of the ASE multiplexed light output to each preliminary line is obtained at both ends of the preliminary line, and the continuity state of the preliminary line is judged by determining whether or not the difference between the two optical powers is within a specific threshold range.

Thus, according to the fourth embodiment, the continuity state of each preliminary line may be judged by using the relative difference between the optical powers at the ends of the preliminary line. Therefore, even when the number of wavelengths or the number of amplifiers is changed afterwards and the absolute values of the optical powers vary accordingly, the reliability of the continuity test may be maintained.

Although the embodiments of the present invention have been described above, the present invention is not limited to the above-described embodiments, and various other embodiments may be made within the technical scope of the present invention as described in the claims.

For example, although the optical transmission apparatus 10 according to the second embodiment includes two optical add-drop multiplexers 12 and 13, the optical transmission apparatus 10 may include three or more optical add-drop multiplexers.

In addition, some or all of the processes that have been described as automatic processes in the above-described embodiments may instead be performed manually. In addition, the process procedures, control procedures, specific names, information including various data and parameters, etc., explained herein in the descriptions or in the drawings may be arbitrarily changed unless otherwise specified.

The constituent elements of each apparatus illustrated in the figures are based on the functional concept and are not necessarily physically structured as illustrated in the figures. In other words, the specific configuration of distribution/integration of each apparatus is not limited to the illustrated example, and a part of or the entire apparatus may be configured by functional or physical distribution/integration in arbitrary units in accordance with the loads and operating conditions. In addition, the processing functions performed by the individual apparatuses may be partly or entirely achieved by a CPU and a program analyzed and executed by the CPU, or by a wired-logic hardware.

The processes described in the above embodiments may be achieved by causing a computer, such as a personal computer or a work station, to perform a program prepared in advance. The program may be distributed through a network, such as the Internet. Alternatively, the program may be recorded on a computer-readable recording medium such as a hard disk, a flexible disk (FD), a compact disc read-only memory (CD-ROM), a magneto optical (MO) disc, or a digital versatile disc (DVD) and be executed by being read from the recording medium by the computer.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment has been described in detail, it should be understood that various changes, substitutions, and alterations could be made hereto without departing from the spirit and scope of the invention.

What is claimed is:

1. An optical transmission apparatus comprising:
an amplifier to receive and amplify wavelength-division-multiplexed signal light;
a first output port to select a wavelength from the wavelength-division-multiplexed signal light amplified by the amplifier and output signal light with the selected wavelength to an operation line, which is one of a plurality of optical transmission lines;
a second output port to output multiplexed light obtained by multiplexing any one of first spontaneous emission light and second spontaneous emission light to a preliminary line, which is another one of the plurality of optical transmission lines, the first spontaneous emission light and the second spontaneous emission light being parts of spontaneous emission light generated by the amplifier, the first spontaneous emission light being in a wavelength range that is not selected by the first output port, and the second spontaneous emission light being in a wavelength range other than a wavelength range of the wavelength-division-multiplexed signal light; and
a judger to judge a continuity state of the operation line by using the signal light output to the operation line by the first output port and judge a continuity state of the preliminary line by using the multiplexed light output to the preliminary line by the second output port.

2. The optical transmission apparatus according to claim 1, further comprising:
a plurality of optical add-drop multiplexers which each include an optical dropping section and an optical adding section, the optical dropping section dropping the signal light with the specific wavelength from the wavelength-division-multiplexed signal light amplified by the amplifier, and the optical adding section adding signal light with a specific wavelength to the wavelength-division-multiplexed signal light dropped by the optical dropping section,
wherein the second output port is provided at each of the optical dropping section and the optical adding section in each optical add-drop multiplexer,
wherein the second output port provided at the optical dropping section in one of the optical add-drop multiplexers outputs the multiplexed light obtained by multiplexing the first spontaneous emission light and the second spontaneous emission light to the preliminary line that connects the optical dropping section to the optical adding section in another one of the optical add-drop multiplexers, and
wherein the second output port provided at the optical adding section in the another one of the optical add-drop multiplexers outputs the multiplexed light obtained by multiplexing the first spontaneous emission light and the second spontaneous emission light to the preliminary line that connects the optical adding section to another device that is disposed downstream of the optical adding section.

3. The optical transmission apparatus according to claim 1, further comprising:
a plurality of optical add-drop multiplexers which each include an optical dropping section and an optical adding section, the optical dropping section dropping the signal light with the specific wavelength from the wavelength-division-multiplexed signal light amplified by the amplifier, and the optical adding section adding signal light with a specific wavelength to the wavelength-division-multiplexed signal light dropped by the optical dropping section,
wherein the second output port is provided at each of the optical dropping section and the optical adding section in each optical add-drop multiplexer,
wherein the second output port provided at the optical dropping section in one of the optical add-drop multiplexers outputs the multiplexed light obtained by multiplexing the first spontaneous emission light and the second spontaneous emission light to the preliminary line that connects the optical dropping section to the optical adding section in another one of the optical add-drop multiplexers, and
wherein the second output port provided at the optical adding section in the another one of the optical add-drop multiplexers outputs the multiplexed light obtained by multiplexing the first spontaneous emission light to the preliminary line that connects the optical adding section to another device that is disposed downstream of the optical adding section.

4. The optical transmission apparatus according to claim 1, wherein the second output port includes
a diffraction grating to divide the first spontaneous emission light and the second spontaneous emission light into individual wavelengths, and
a mirror array including a plurality of mirrors that reflect the first spontaneous emission light and the second spontaneous emission light that have been divided into individual wavelengths by the diffraction grating, angles of the mirrors being controlled so as to switch the preliminary line to which the first spontaneous emission light and the second spontaneous emission light with individual wavelengths are output.

5. The optical transmission apparatus according to claim 4, wherein the mirrors included in the mirror array in the second output port are arranged in close contact with each other.

6. The optical transmission apparatus according to claim 1, wherein the judger receives optical power of the multiplexed light output to the preliminary line by the second output port at both ends of the preliminary line, and judges the continuity state of the preliminary line by determining whether or not the two optical powers are within a specific threshold range.

7. The optical transmission apparatus according to claim 1, wherein the judger receives optical power of the multiplexed light output to the preliminary line by the second output port at both ends of the preliminary line, and judges the continuity state of the preliminary line by determining whether or not the difference between the two optical powers is within a specific threshold range.

8. A continuity testing method comprising:
receiving wavelength-division-multiplexed signal light;
amplifying the wavelength-division-multiplexed signal light;
selecting a specific wavelength from the wavelength-division-multiplexed signal light amplified in the amplifying;
outputting signal light with the selected wavelength to an operation line, which is one of a plurality of optical transmission lines;
outputting multiplexed light obtained by multiplexing any one of first spontaneous emission light and second spontaneous emission light to a preliminary line, which is another one of the plurality of optical transmission lines, the first spontaneous emission light and the second spontaneous emission light being parts of spontaneous emission light generated in the amplifying, the first spontaneous emission light being in a wavelength range that is not selected in the outputting signal light, and the second spontaneous emission light being in a wavelength range other than a wavelength range of the wavelength-division-multiplexed signal light; and judging a continuity state of the operation line by using the signal light output to the operation line in the outputting signal light and a continuity state of the preliminary line by using the multiplexed light output to the preliminary line in the outputting multiplexed light.

\* \* \* \* \*